May 3, 1955

O. A. BECKER 2,707,666

DEVICE FOR CONVEYING OR TRANSFERRING
CLASSIFIED OBJECTS, IN PARTICULAR
FILES, INDEX CARDS OR THE LIKE

Filed Oct. 24, 1950

O. A. BECKER 2,707,666

DEVICE FOR CONVEYING OR TRANSFERRING
CLASSIFIED OBJECTS, IN PARTICULAR
FILES, INDEX CARDS OR THE LIKE

Filed Oct. 24, 1950

O. A. BECKER 2,707,666

DEVICE FOR CONVEYING OR TRANSFERRING
CLASSIFIED OBJECTS, IN PARTICULAR
FILES, INDEX CARDS OR THE LIKE

Filed Oct. 24, 1950

INVENTOR:-
Otto Alfred Becker
By Alexander & Dowell
ATTORNEYS

May 3, 1955

O. A. BECKER 2,707,666

DEVICE FOR CONVEYING OR TRANSFERRING
CLASSIFIED OBJECTS, IN PARTICULAR
FILES, INDEX CARDS OR THE LIKE

Filed Oct. 24, 1950

INVENTOR:-
Otto Alfred Becker
By Alexander Mordell
ATTORNEYS

May 3, 1955

O. A. BECKER 2,707,666

DEVICE FOR CONVEYING OR TRANSFERRING
CLASSIFIED OBJECTS, IN PARTICULAR
FILES, INDEX CARDS OR THE LIKE

Filed Oct. 24, 1950

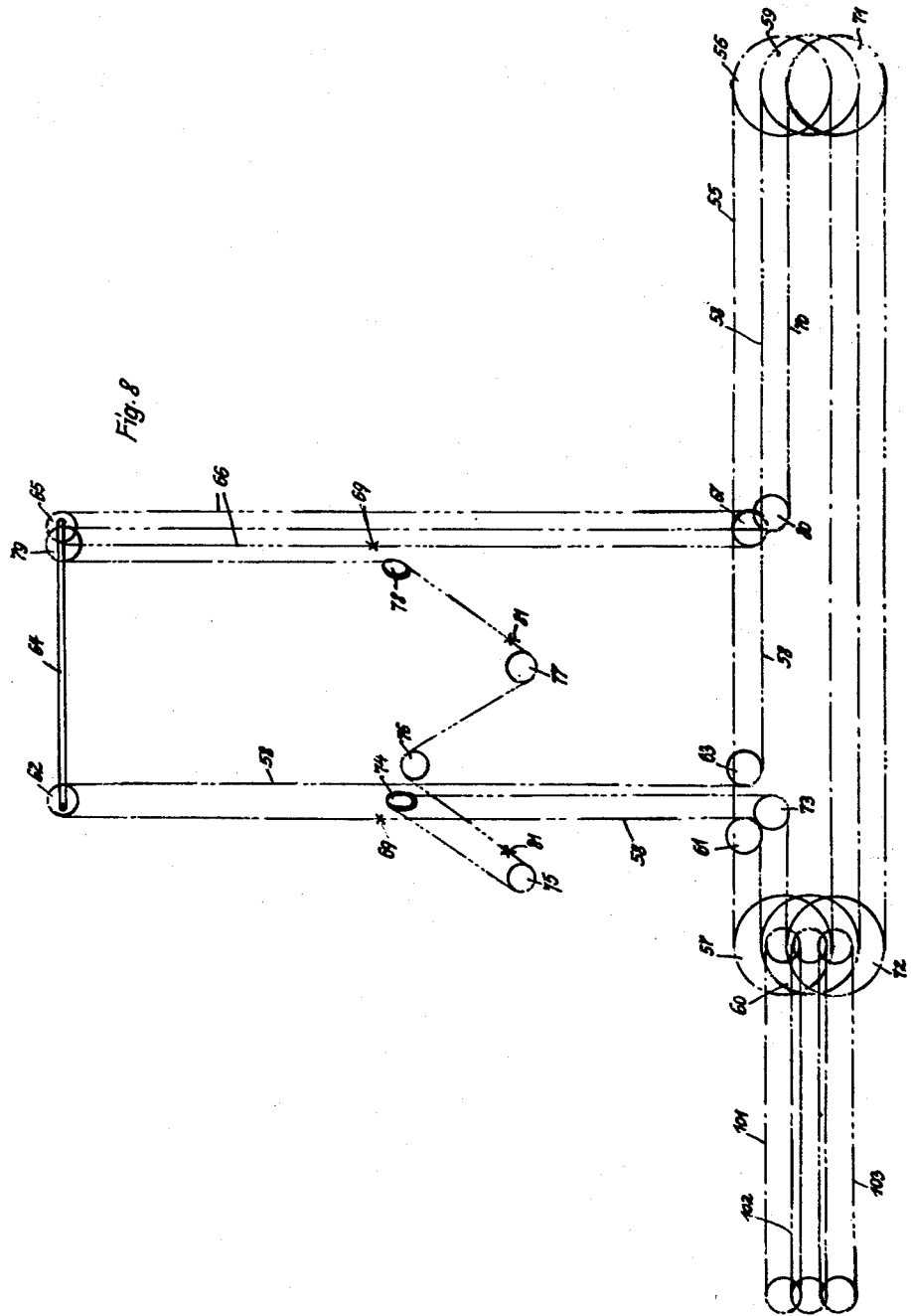

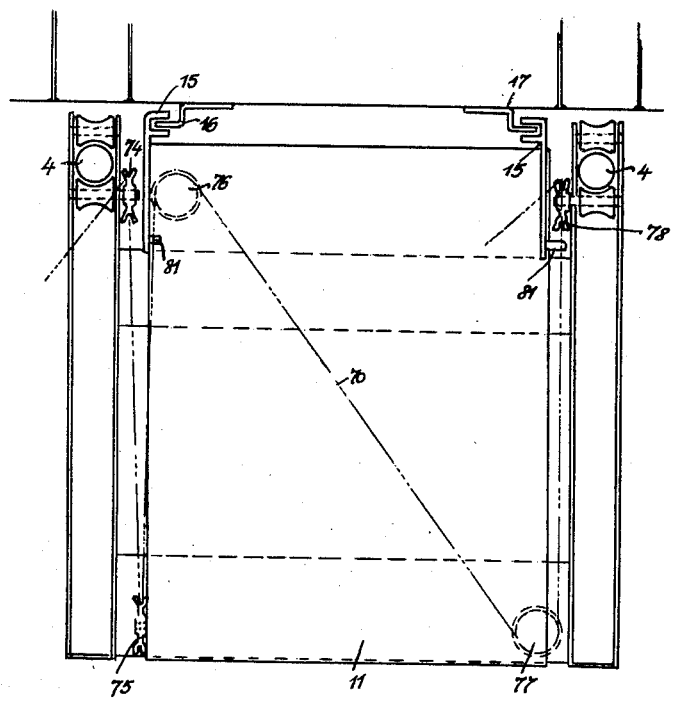

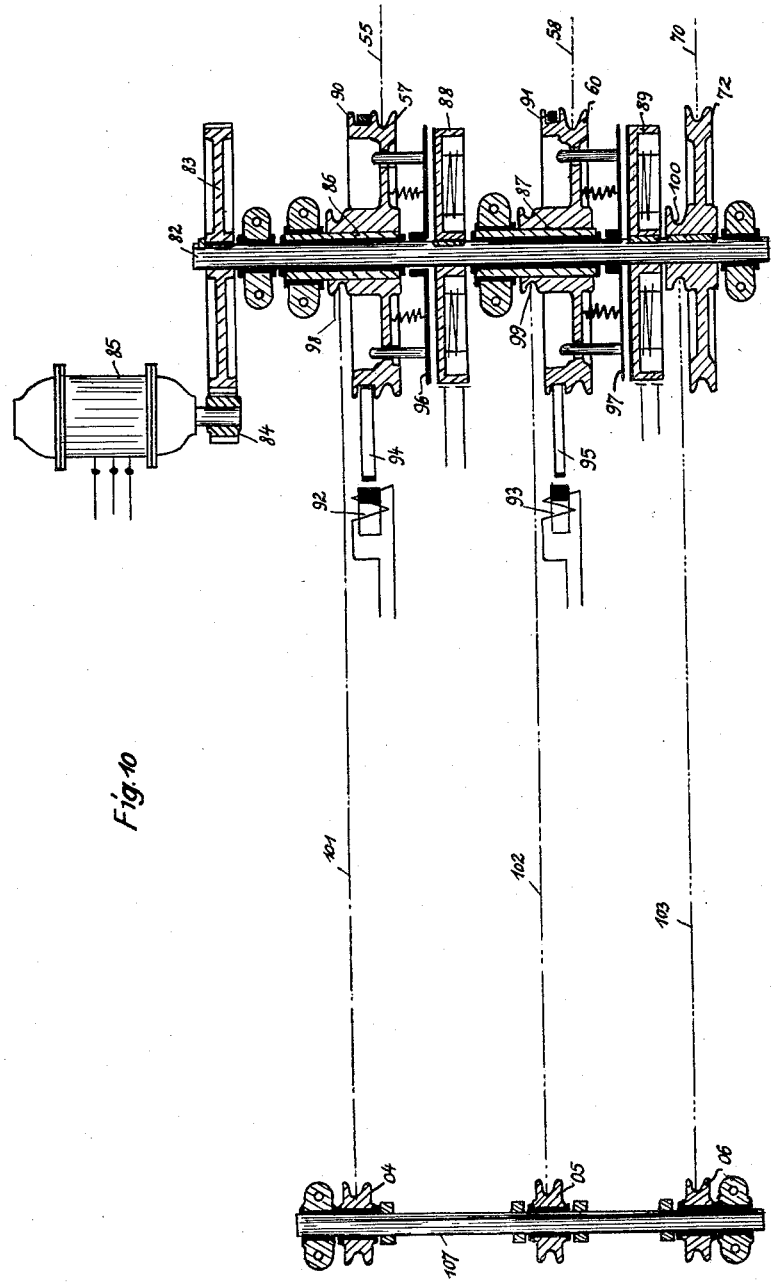

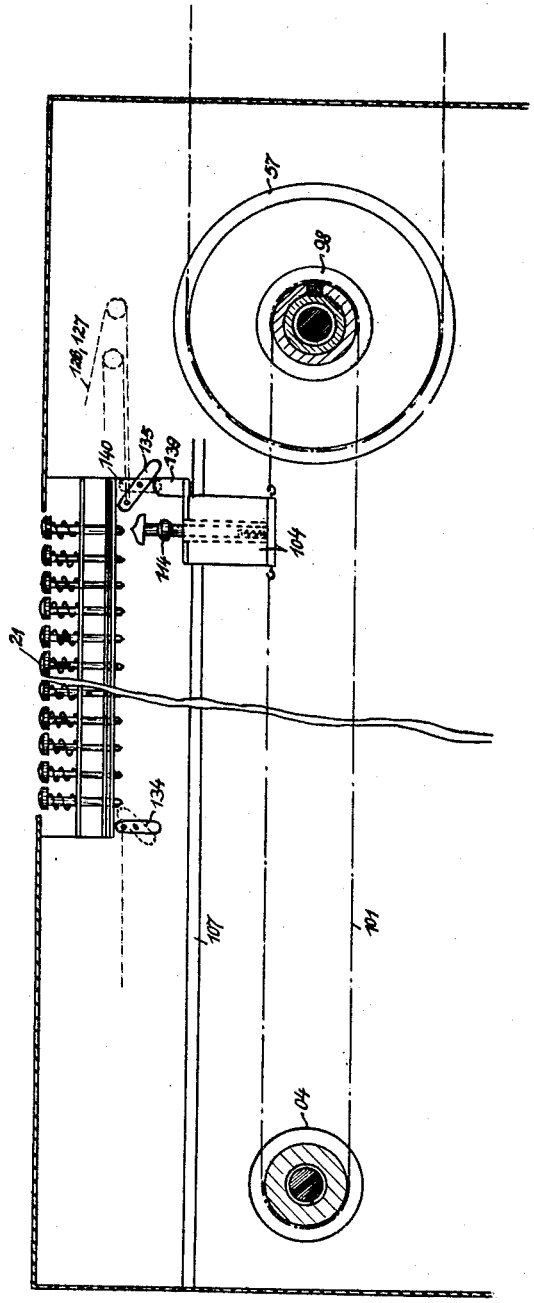

May 3, 1955
O. A. BECKER
2,707,666
DEVICE FOR CONVEYING OR TRANSFERRING
CLASSIFIED OBJECTS, IN PARTICULAR
FILES, INDEX CARDS OR THE LIKE
Filed Oct. 24, 1950
21 Sheets-Sheet 11
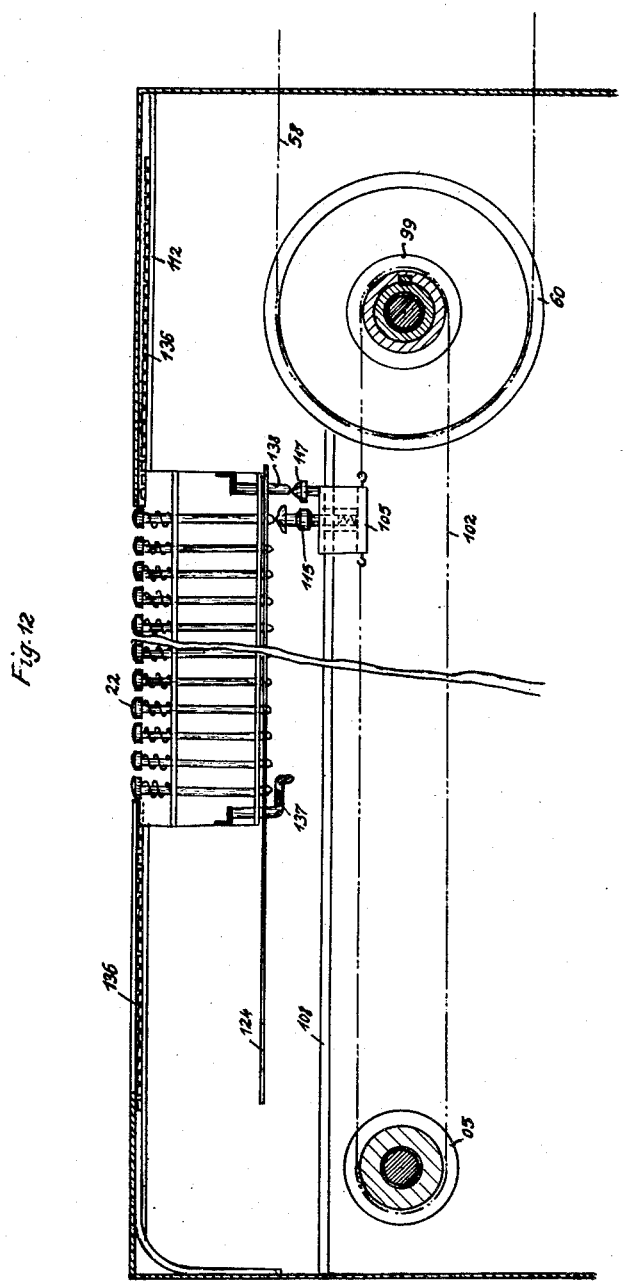

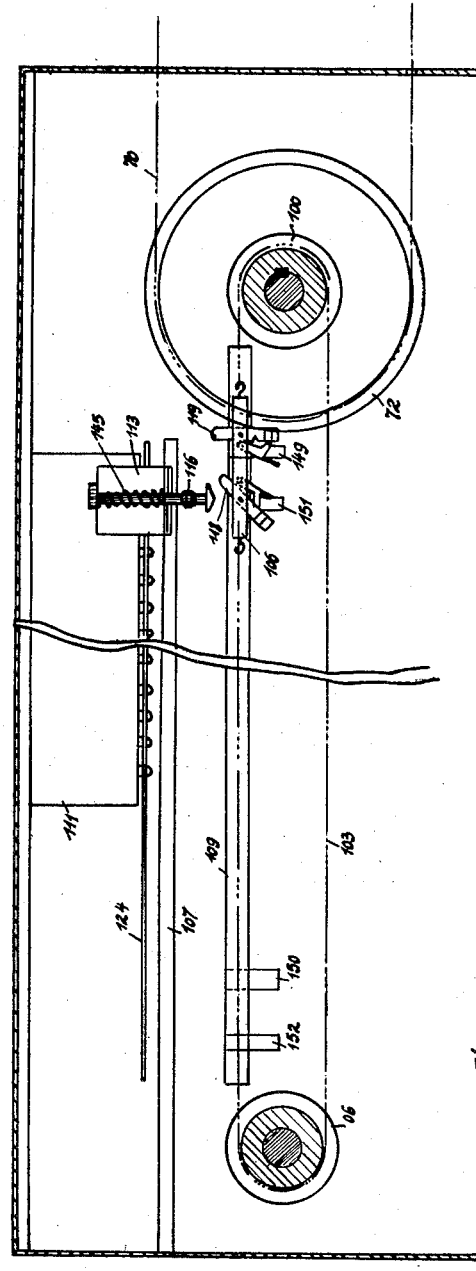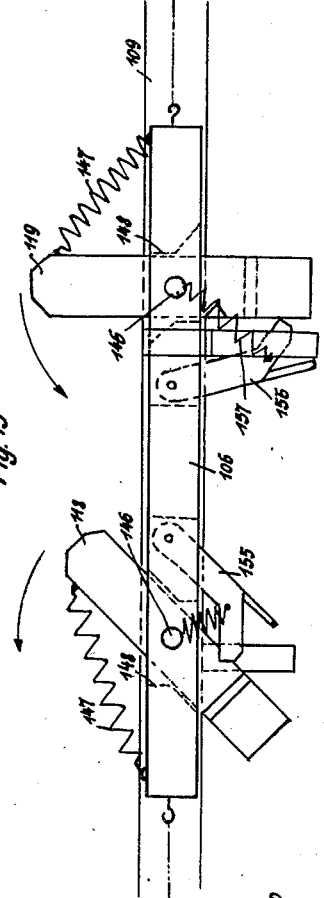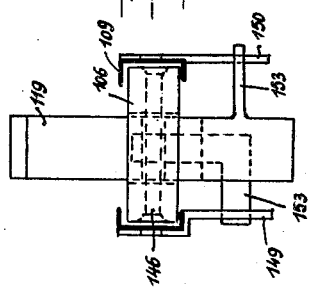

May 3, 1955
O. A. BECKER
2,707,666
DEVICE FOR CONVEYING OR TRANSFERRING
CLASSIFIED OBJECTS, IN PARTICULAR
FILES, INDEX CARDS OR THE LIKE
Filed Oct. 24, 1950
21 Sheets-Sheet 13
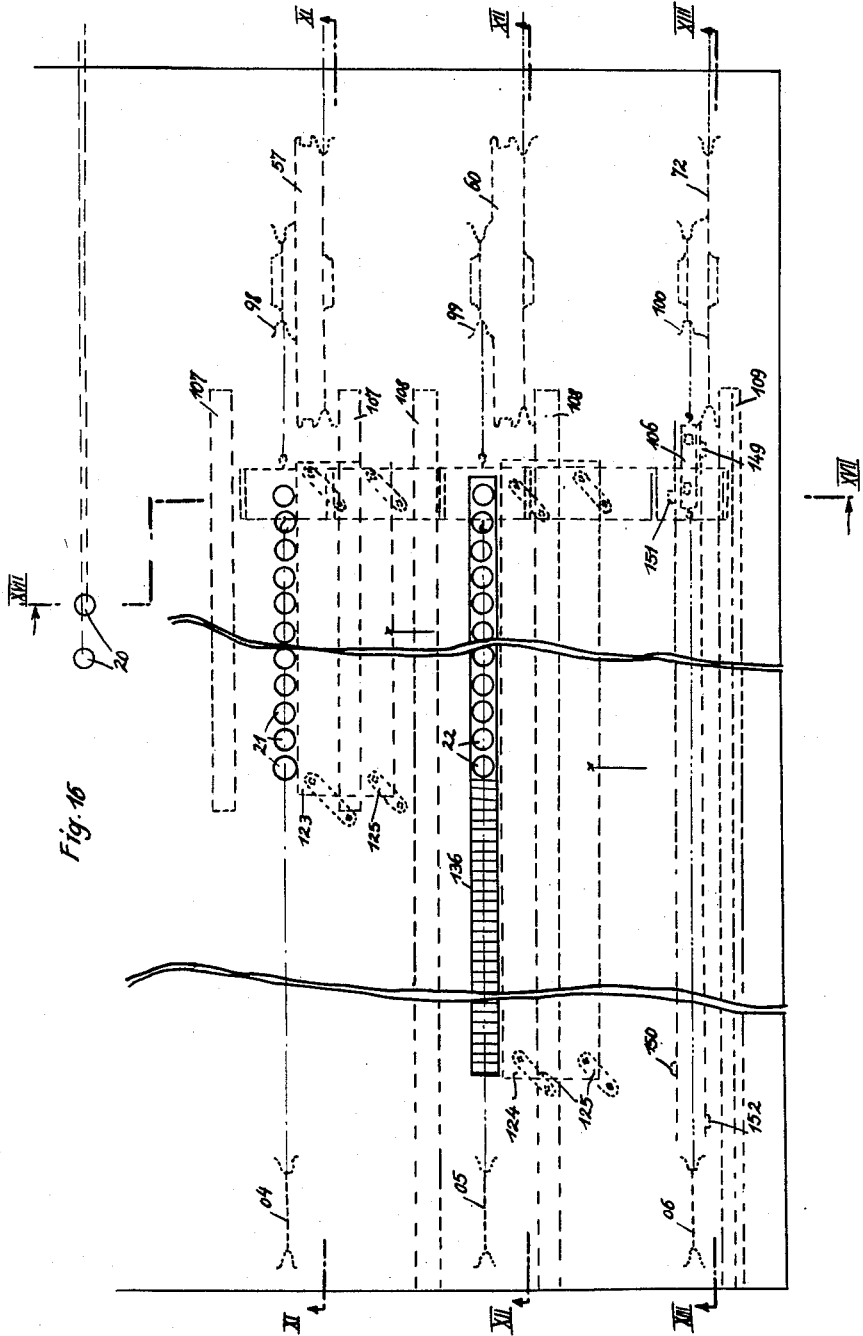

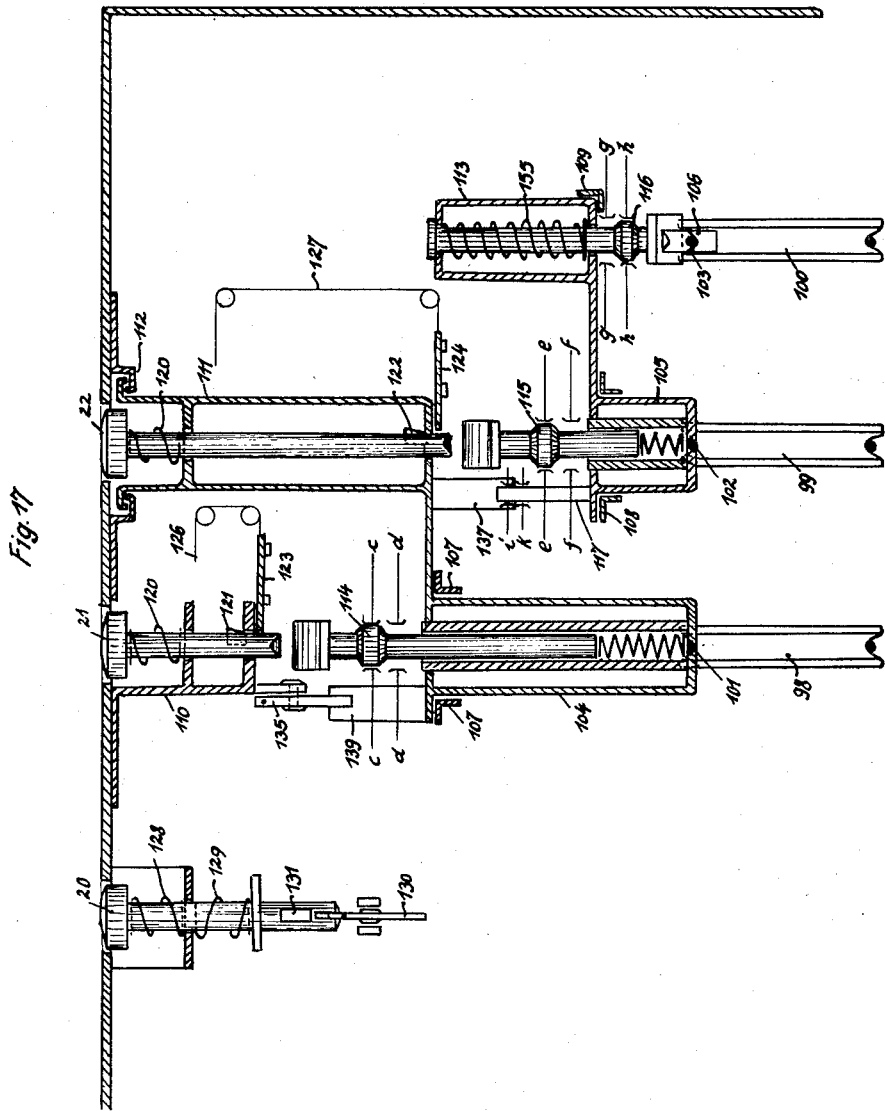

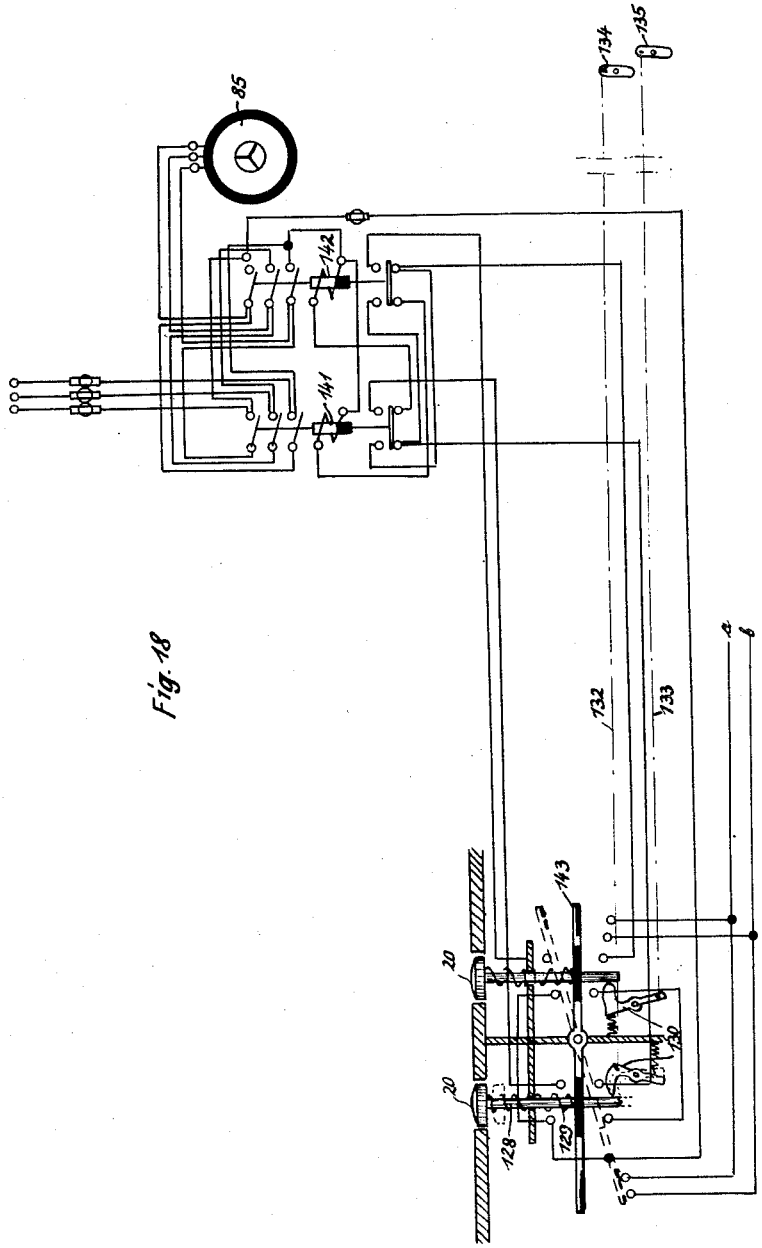

May 3, 1955

O. A. BECKER 2,707,666

DEVICE FOR CONVEYING OR TRANSFERRING
CLASSIFIED OBJECTS, IN PARTICULAR
FILES, INDEX CARDS OR THE LIKE

Filed Oct. 24, 1950

INVENTOR:-
Otto Alfred Becker
By
ATTORNEYS

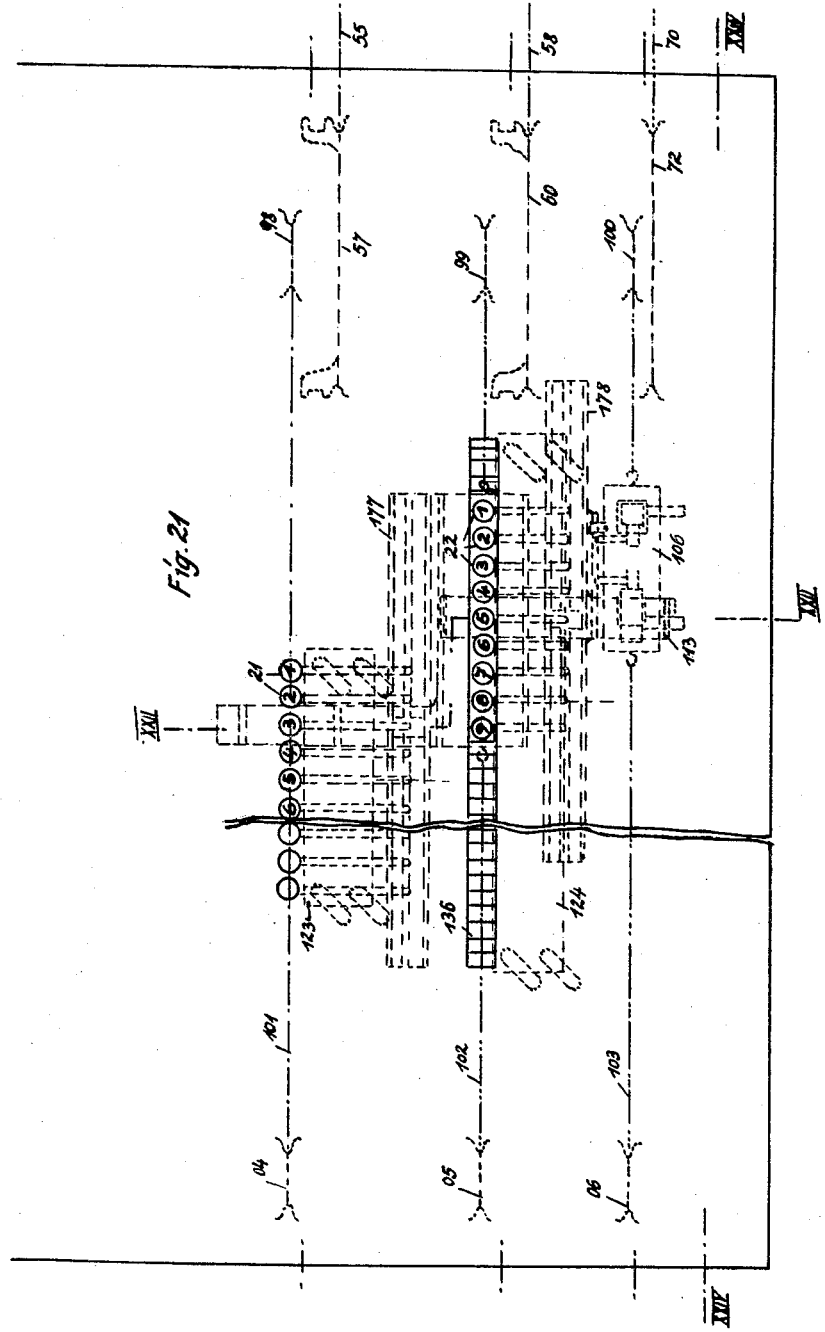

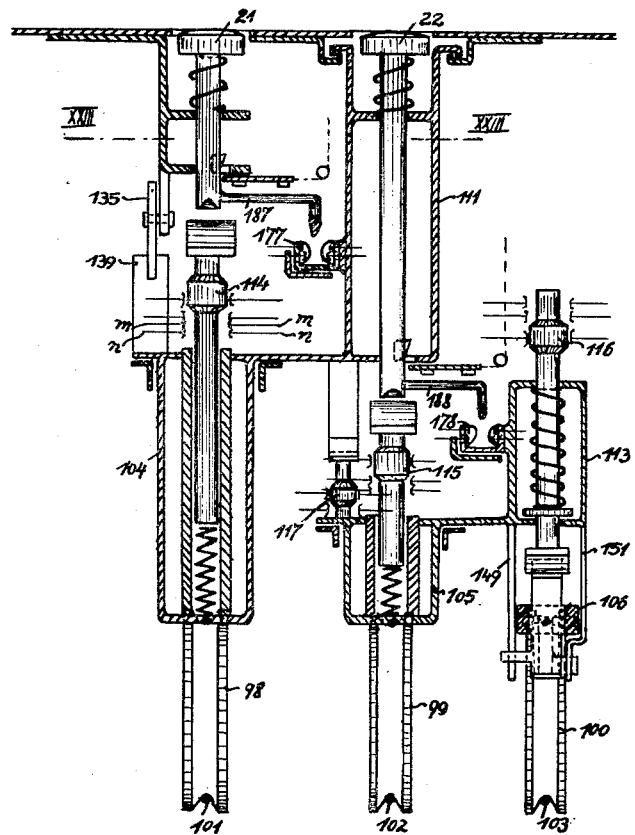

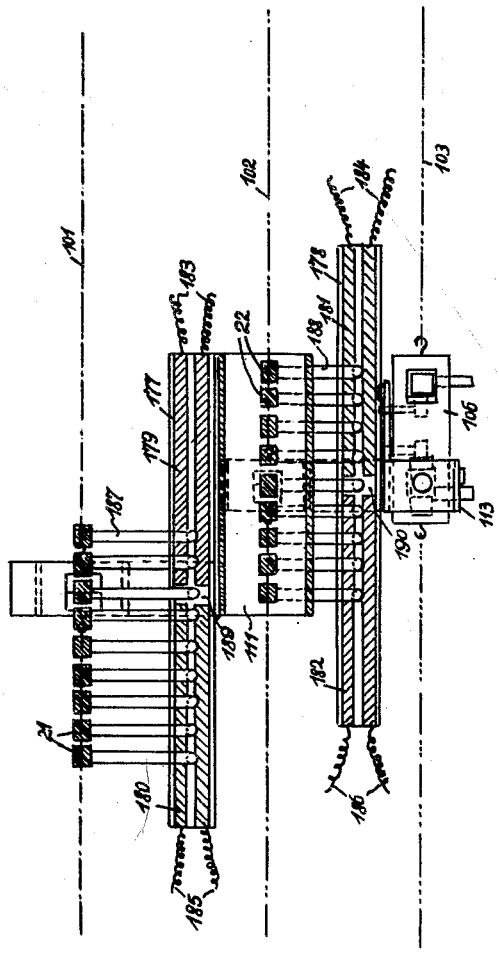

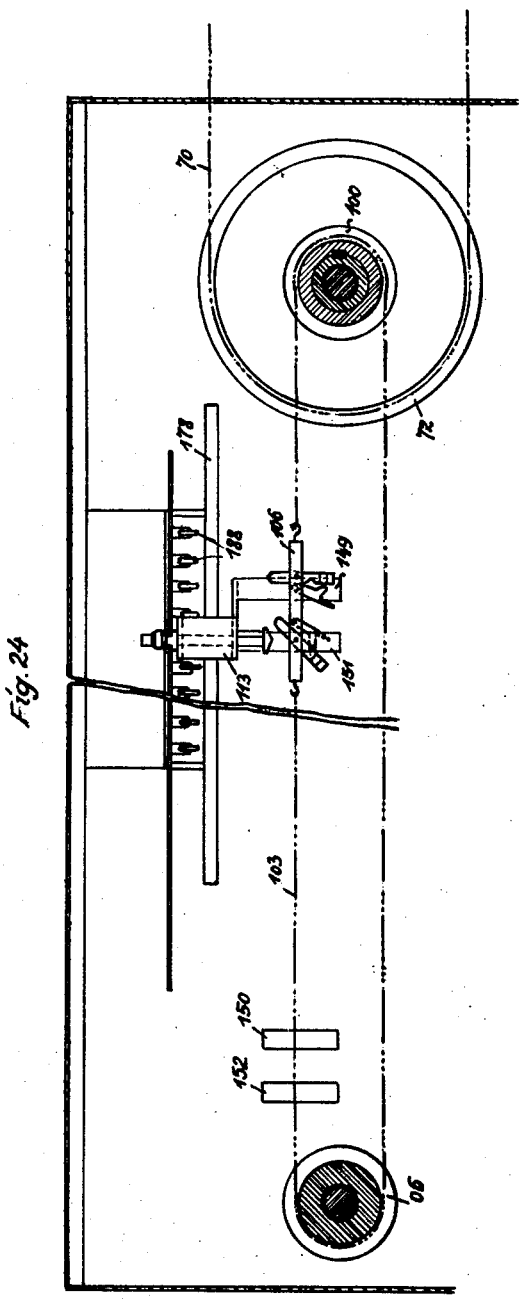

United States Patent Office 2,707,666
Patented May 3, 1955

2,707,666

DEVICE FOR CONVEYING OR TRANSFERRING CLASSIFIED OBJECTS, IN PARTICULAR FILES, INDEX CARDS OR THE LIKE

Otto Alfred Becker, Saarbrucken, Saar Territory

Application October 24, 1950, Serial No. 191,818

5 Claims. (Cl. 312—319)

The invention refers to a device for conveying serially classified units such as files or file jackets, index cards or the like in which each such unit or object is selectively withdrawn from its position by a centrally controlled conveyor and delivered to a working point from which it is returned after use to its original position in a serially classified bank or equivalent arrangement.

It has heretofore been proposed to employ for this purpose a serially classified container unit or cabinet in tiered arrangement and to provide a suitable lifting element or lifting plate by means of which any individual unit required can be withdrawn from its original place of storage, transferred vertically and/or moved horizontally into an access or working position, and restored after use to its original position in the filing bank or register.

According to the present invention such selection and transfer of individual units can proceed horizontally as well as vertically, thus enabling one of a number of serially tiered units to be conveniently transferred from the storage or filing position to an access position vertically above or below, or horizontally to the right or the left of, the filing position and returned after use to the original position, using a lifting or hoisting conveyor element. In accordance with the invention this conveyor element capable of unidirectional motion, is supported on bearer elements which are themselves movable transversely in a second direction. Such bearers are suitably combined to form a movable frame constituting a second conveyor element by which the container for such articles or units can be displaced and arrested by a selector mechanism at the particular bank or row in which the required article or unit is filed or classified. The lifting or hoisting conveyor element or lifting plate is then caused to act, and moves vertically into the position of the required file unit which is then displaced by movable follower units onto the lifting plate; or returns the required file unit into the filing or classifying bank or row.

A conveyor device of this nature can further be constructed in such manner that it is continuously driven after returning any unit into its initial position until, first, the lifting plate in the conveyor frame and, secondly, the conveyor element itself, attains a predetermined and constant end position, e. g. at the end of the particular conveyor track, in which it is furthest removed from the aforesaid access point or position; such end position thus forming the starting or initial position for the next succeeding conveying operation.

In an alternative arrangement of the mechanism according to the invention the motion of the conveyor element is caused to cease after return of the selected unit into the original position, and the consequent variable resting position of the said conveyor elements, in particular the conveyor frame and lifting plate, is used as the starting position for the next conveying operation. In the subsequent selection of a further object or unit, the conveyor frame and lifting plate are caused to travel along the shortest path, from the position of the last unit selected and returned to the original position, to the position of the next unit to be selected and transferred.

The invention embraces not only conveyors for storage banks containing filing jackets or containers arranged in vertical tiers or horizontal rows, but likewise conveyor elements for any other serially classified objects, containers or the like. Such objects or containers can for instance suitably be classified in horizontally intersecting rows, as in the case of vertical filing systems, in particular vertically filed card indexes and card accounting systems, and also punched card indexes. The mechanical arrangements used in such conveyor systems according to the present invention can equally well be used in other applications such as for adding and accounting machines, and also as combination mechanisms for other purposes.

The attached drawings show examples of conveyor arrangements in accordance with the present invention, and also show several suitable applications.

I will explain the invention with reference to the accompanying drawings which show several practical embodiments thereof to enable others familiar with the art to adopt and use the same, and will summarize in the claims the novel features of construction and novel combinations of parts, for which protection is desired.

In said drawings:

Fig. 8 shows diagrammatically the general arrangement of a cord or chain drive for actuating the conveyor element, in accordance with Figs. 1 to 3.

Fig. 9 shows the lifting plate or carrier of the aforesaid conveyor element, in plan view.

Fig. 10 shows a part of the cord drive with corresponding actuating elements, in plan view.

Figs. 11, 12, and 13 show sectional elevations along lines XI—XI, XII—XII, and XIII—XIII, respectively, of Fig. 16.

Figs. 14 and 15 show front and side elevations of the contact slide shown in Fig. 13, on a larger scale.

Figure 1:
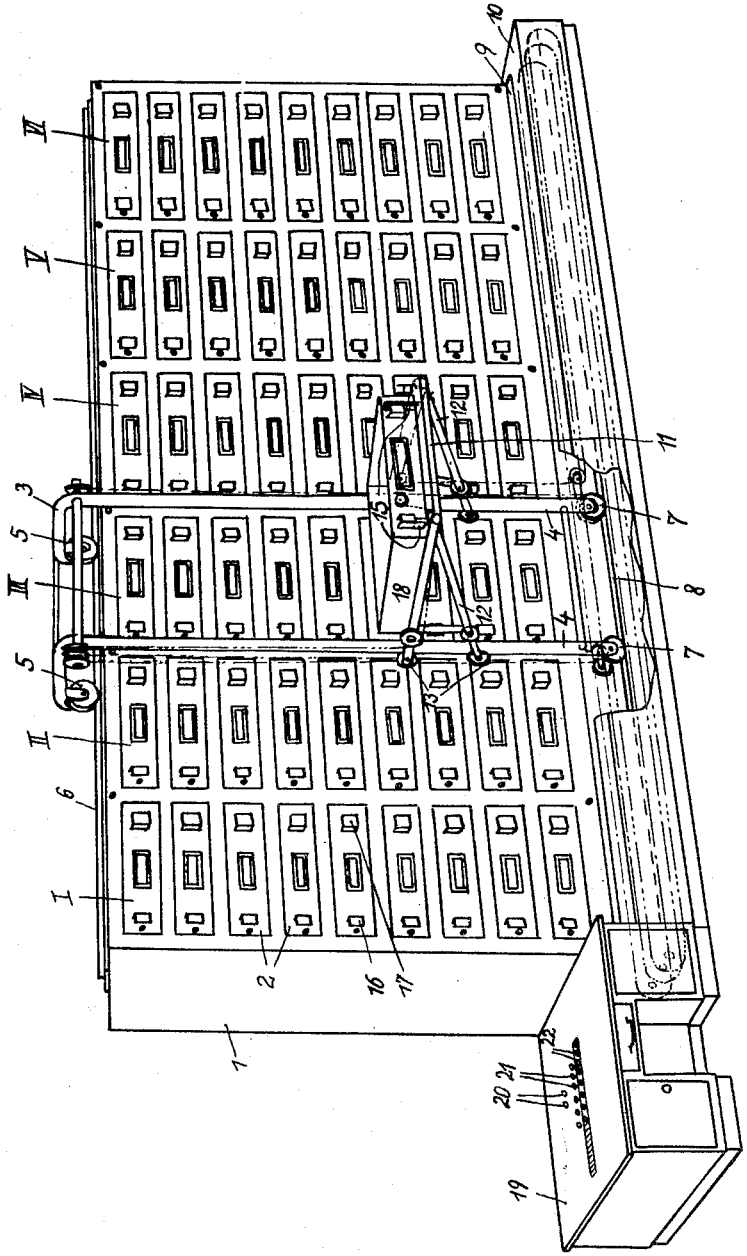
Fig. 1 is a perspective view of a storage bank with horizontally-arranged containers in the form of drawers, and showing the conveyor device for such containers or drawers and a sorting table in conjunction with the preceding arrangement in the nature of a work table or desk containing the selector mechanisms and keying arrangements for selecting the required individual containers or drawers.

Fig. 16 shows a plan view of the work table or sorting desk shown in Fig. 1.

Fig. 17 shows a cross-section through the said work table along line XVII—XVII of Fig. 16.

Fig. 18 is a diagrammatic view of the electrical circuit for the driving motor.

Figure 19:
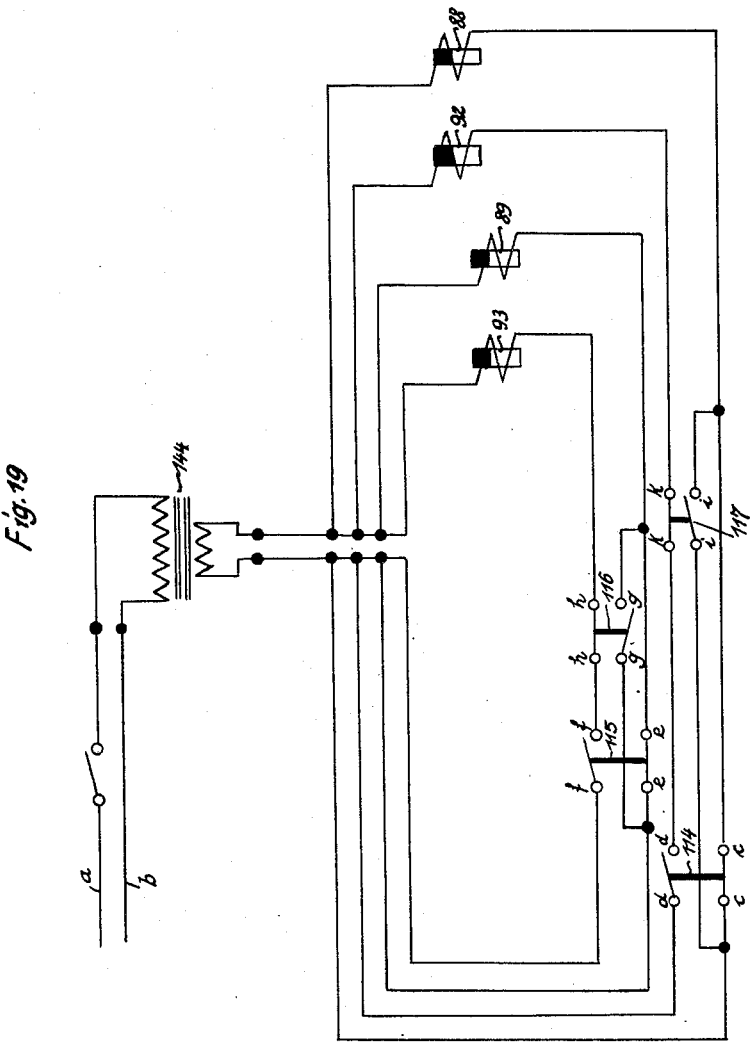

Fig. 19 is a diagrammatic view of the electrical circuit for the connection of the coupling and braking elements and contacts of the selector mechanism.

Figure 20:
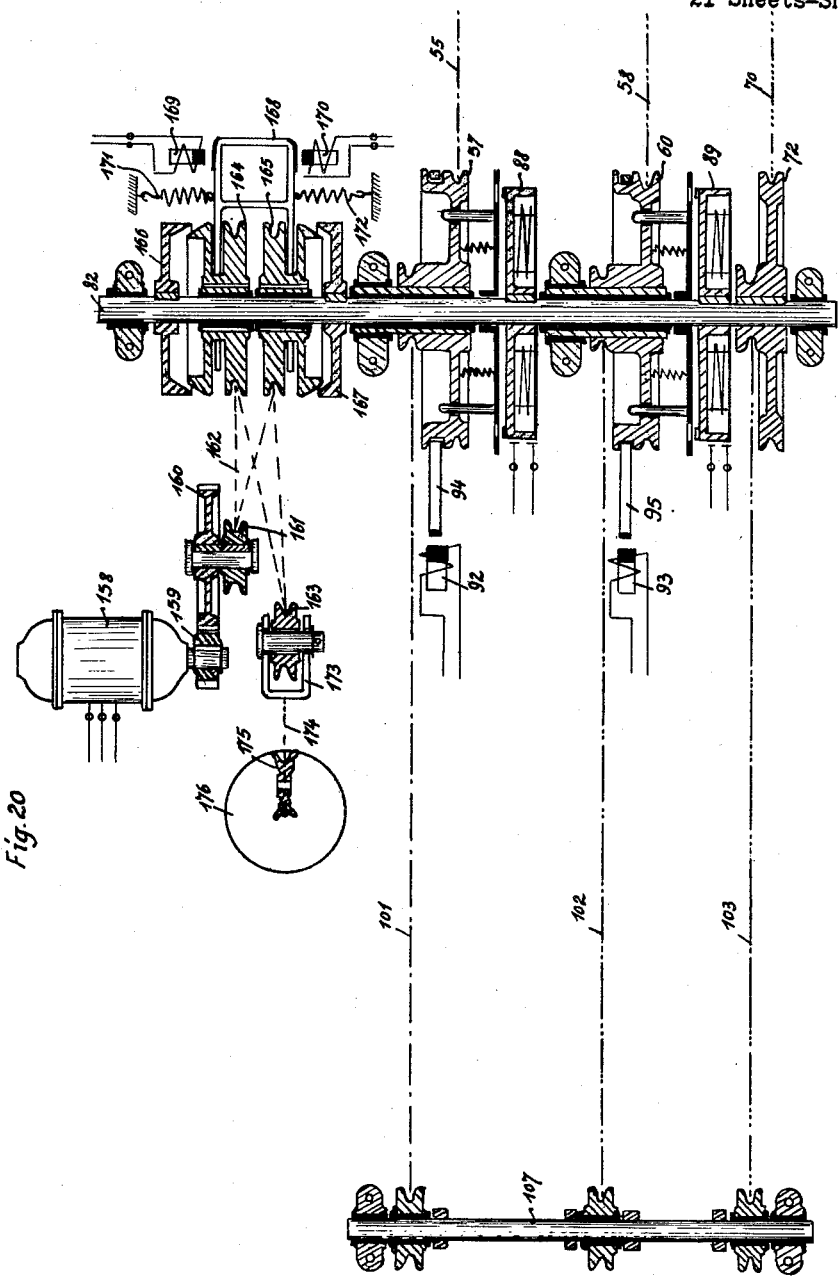

Fig. 20 shows a plan view of the gearing in accordance with Fig. 10, for a modified form of gear control with alternative gear elements for power transmission between the driving motor and the cord or chain drive.

Fig. 21 shows a plan view of the work table or sorting desk in accordance with Fig. 16, showing alternative modifications of the selector gear.

Fig. 22 shows a partial cross-sectional view through the work table, along the line XXII—XXII of Fig. 21.

Fig. 23 shows a horizontal section through the selector gear along the line XXIII—XXIII of Fig. 22; and Fig. 24 shows a sectional elevation through the selector gear along the line XXIV—XXIV of Fig. 21.

The arrangement according to Fig. 1 consists of a cabinet frame 1 with containers 2 in the form of drawers arranged vertically in tiers, i. e., in six banks I–VI of nine drawers each. The cabinet frame is provided with a conveyor carriage 3, the vertical rails 4 of which extend over the full height of the cabinet, the upper end of which carries rollers 5 running on a headrail 6, and the lower end of which carries rollers 7 running on a footrail 8. The conveyor carriage 3 projects downwardly through a slot 9 in the cabinet base 10, containing the driving gear. This slotted base 10 extends across the whole length of the cabinet frame 1 in such manner that the carriage 3 can travel from one end of the cabinet frame to the other.

A bracketed lifting plate or carrier 11 supported by struts 12 moves along the vertical rails 4 of the carriage, by means of pairs of rollers 13. A suitable driving mechanism is provided to move the carrier 11 on the carriage 3 in such manner that it is able to stop on a level with the bottom of any container of any particular bank.

The carrier 11 is provided with movable stops or followers 15 which are adjustable in a direction parallel to the sides of the carrier, i. e. at right angles to the face of the cabinet frame. These followers work in conjunction with other stops 16, 17, projecting from the front of each container or drawer. The followers 15 of the lifting plate or carrier are initially in such position that they engage behind the stops 16, 17 when the carrier 11 moves in the carriage. When the carrier stops at the bottom level of any container or drawer, the corresponding followers 15 engage behind the stops 16, 17 of the particular container, and are then actuated, and draw the container horizontally out of the cabinet frame on to the lifting plate or carrier 11. In Fig. 1, this operation is just in the course of being performed with drawer 18 of the bank III.

At one end of the cabinet frame 1 a work table or sorting desk 19 is fitted, serving as the working or access position and incorporating a control mechanism for actuating the conveyor carriage 3, the lifting plate or carrier 11, and the corresponding followers 15. The table 19 is provided with a number of operating keys 20, 21, 22. The keys 20 may be used to start the driving element, for instance an electric motor. The key banks 21, 22 are allocated to the individual containers or units suitably in such manner that any container 2, has a corresponding key. If one of the keys of such an arrangement is depressed, the carriage 3 with the as yet empty carrier 11 moves automatically in front of a particular container bank or tier I–VI, after which the lifting plate or carrier 11 is raised to the level of a particular container, corresponding to the depressed key, and the container is now withdrawn by the action of the followers 15 from the frame onto the carrier, which latter now conveys the container downwardly and by the action of the carriage 3 moving to the left (Fig. 1), to the work table 19, whereupon the drive is automatically disconnected. When the container is no longer required it is returned by renewed starting of the driving gear into its original position by a reverse sequence of operations. The carriage travels along the rails 6, 8 until it is in front of the corresponding container bank I–VI where the carrier with the container is lifted to the level of the empty compartment after which the carrier stops and by means of its followers 15 returns the container into its place in the cabinet frame.

Figure 2:
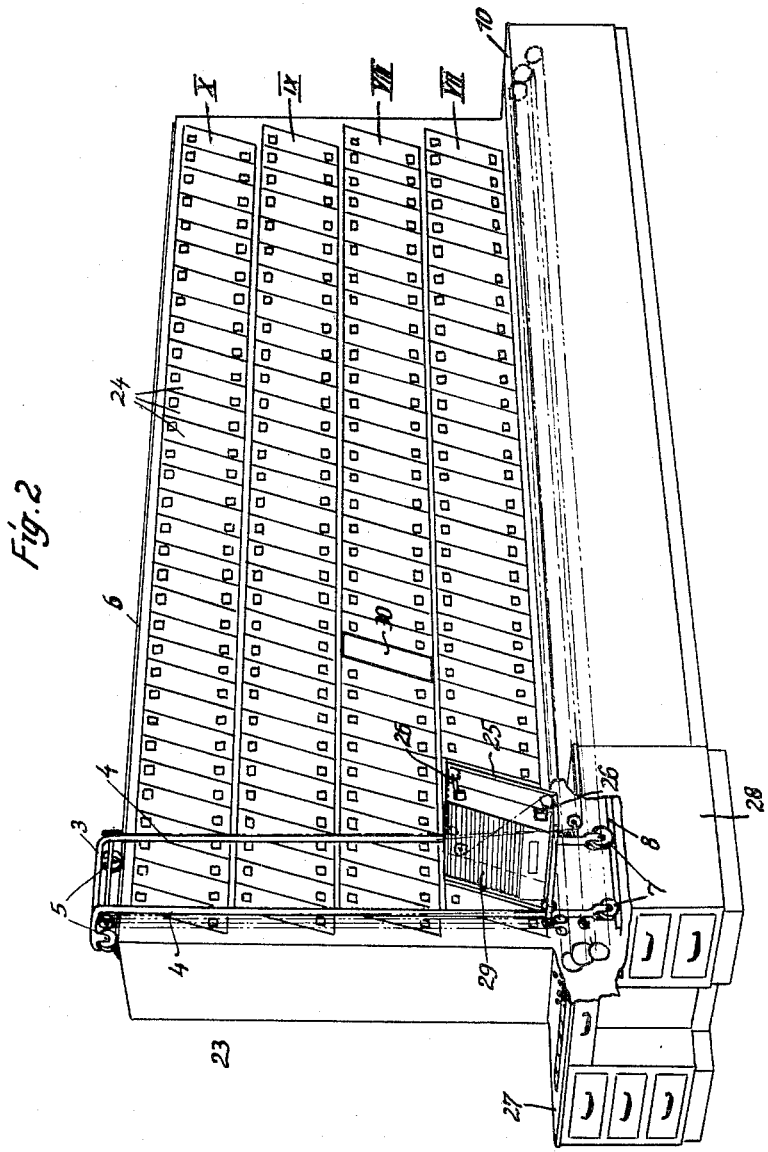
Fig. 2 is a perspective view of an alternative arrangement of cabinets or banks, in particular a bank of card index drawers, the container elements of which are obliquely placed, and showing the means of conveyance associated with a work table or sorting desk arranged transversely to the cabinet bank.

In the arrangement according to Fig. 2 the cabinet frame 23 is filled with obliquely inclined containers for visible index card blocks. The containers are in this case arranged in horizontal rows VII–X. The equipment of the cabinet frame is the same as that described in Fig. 1 and is indicated where appropriate by identical reference numbers. The carrier 25 is in this case obliquely inclined to correspond to the position of the containers 24 and its followers 26 are movable parallel to the upper and lower edges of the carrier. The work table 27 is placed transversely to the cabinet frame 23 and its right-hand half 28 projects sufficiently beyond the face of the cabinet frame 23 to enable the carrier 25 with the corresponding index card block 29, in the position shown, to be easily handled by the user seated at the table 27. According to the arrangement of the mechanism the conveyor can be constructed in such manner that for returning the index card block 29 into the filing drawer 30, either the carriage 3 first moves to the right and then the carrier rises to the level of row VIII, or the carrier 25 is first raised to the level of row VIII and then travels with the carriage to the right until it is opposite the required drawer or compartment.

Figure 3:
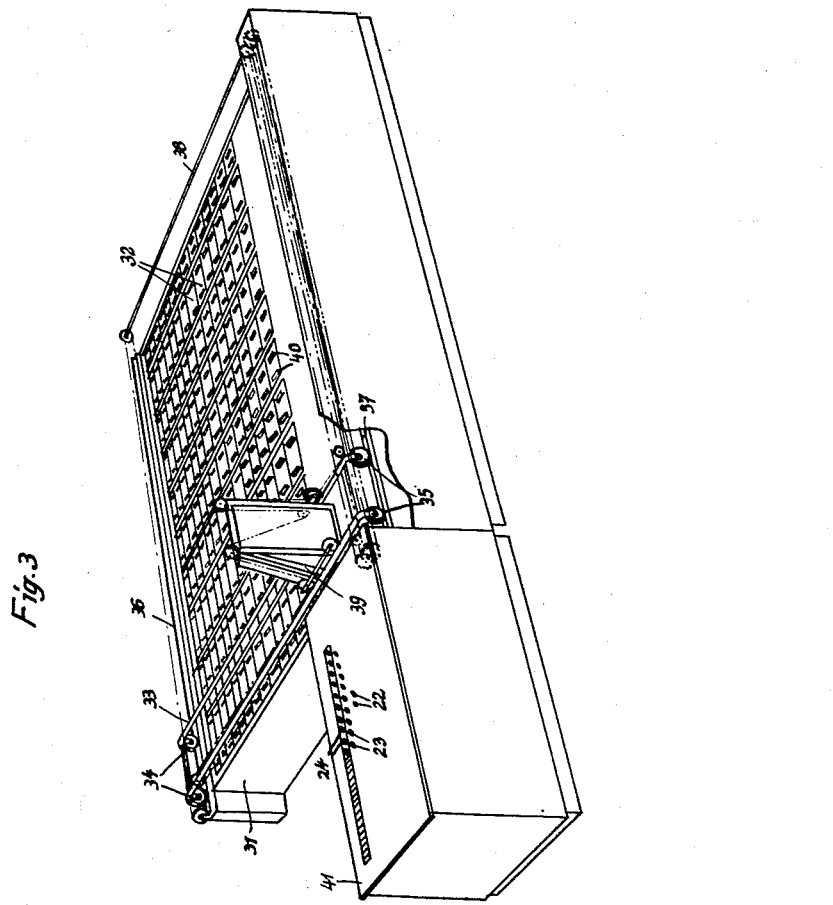
Fig. 3 is a perspective view of a horizontally-arranged card-index bank with index card containers capable of being withdrawn upwardly, also showing the conveyor element and work table.

In the arrangement according to Fig. 3 the cabinet frame 31 is arranged horizontally. The containers 32 are withdrawn upwardly out of the frame. The carriage consists of a horizontally-placed rack 33 running with wheels 34, 35 on rails 36, 37. To prevent skewing of the travelling rack 33 while moving along the rails 36, 37, a spindle 38 is provided by which the drive is transmitted through endless cords to both ends of the rack. The longitudinal bearers of the rack support a vertically-placed carrier 39 movable on wheels along the bearers. This carrier is provided with followers (omitted on the drawing) moving parallel to the vertical sides of the carrier plate and controlling the upward and downward motion of the carrier plate respectively, working in conjunction with lugs 40 on the containers 32. Next to the cabinet frame 31, a sorting or working table 41 is provided containing the operating and controlling mechanisms and equipped with operating buttons 20, 21, 22 in accordance with Fig. 1. When the arrangement is set in motion the rack or carriage 33 first moves along the rails 36, 37 to the particular row in the bank corresponding to the position of the required container. After this the carrier plate 39 is moved along the rack or carriage to the position of the required container which is withdrawn from the frame by means of the followers and conveyors by a corresponding series of operations to the working position on the table 41 as shown in Fig. 3.

Figure 4:
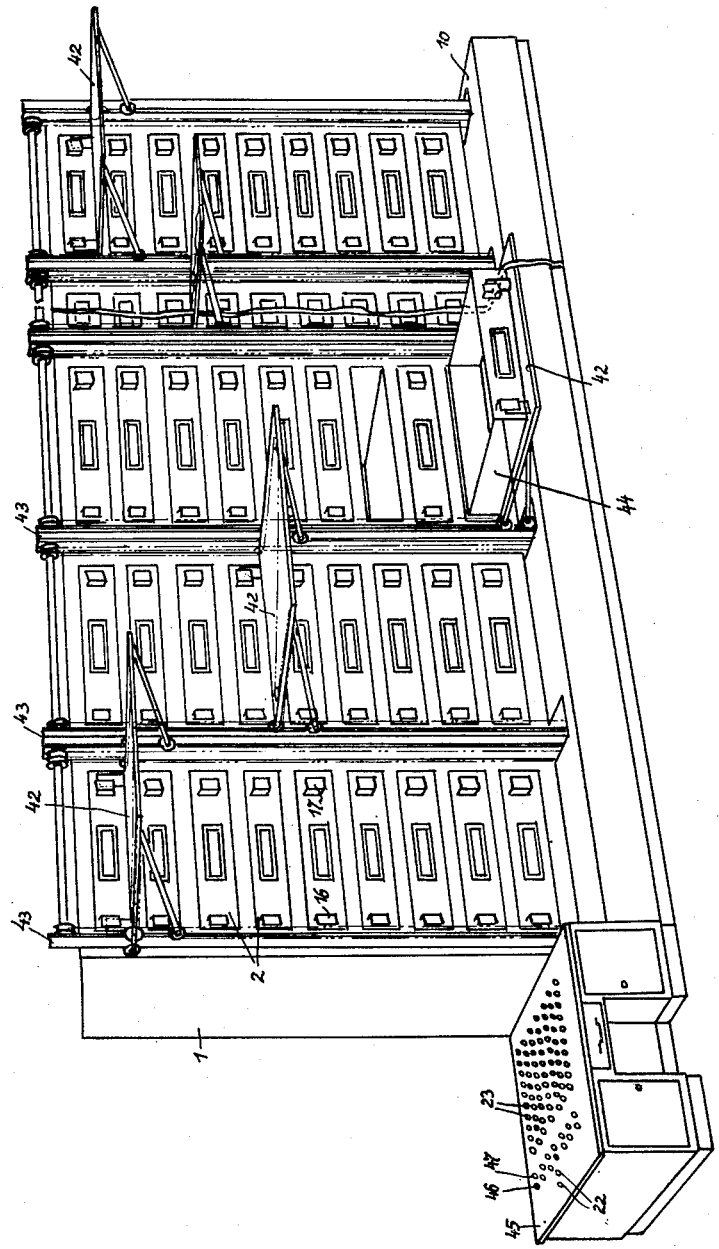
Fig. 4 shows a further modification of a bank with containers in the form of drawers as shown in Fig. 1, but having separate means for conveying in the vertical direction for vertically arranged indexing or classifying rows or tiers.

Fig. 4 shows further a cabinet frame 1 the containers 2 in which are, as in Fig. 1, arranged as sliding drawers in vertical banks. In this case, however, each vertical bank is assigned a separate carrier frame 42 capable of moving vertically on fixed guides 43 over the cabinet frame. Each such carrier plate is equipped in the same manner as the carrier plate 11 in Fig. 1, with follower elements (only partially represented) working in conjunction with the lugs 16, 17 of the containers and serving the purpose of withdrawing the containers from the cabinet frame onto the carrier plate as well as returning the same container to its place in the cabinet frame after use. The carrier plates 42 serve only the purpose of conveying the containers 44 from the higher positions to the working positions at the bottom of the stack, no lateral travel being contemplated.

The working table 45 in this case incorporates in addition to the keys or buttons 22 for starting and stopping the mechanism, the keys 21 assigned serially to the individual containers, also two rows of keys 46 and 47, for operating the upward and downward motion of the carrier plates respectively.

Figure 5:
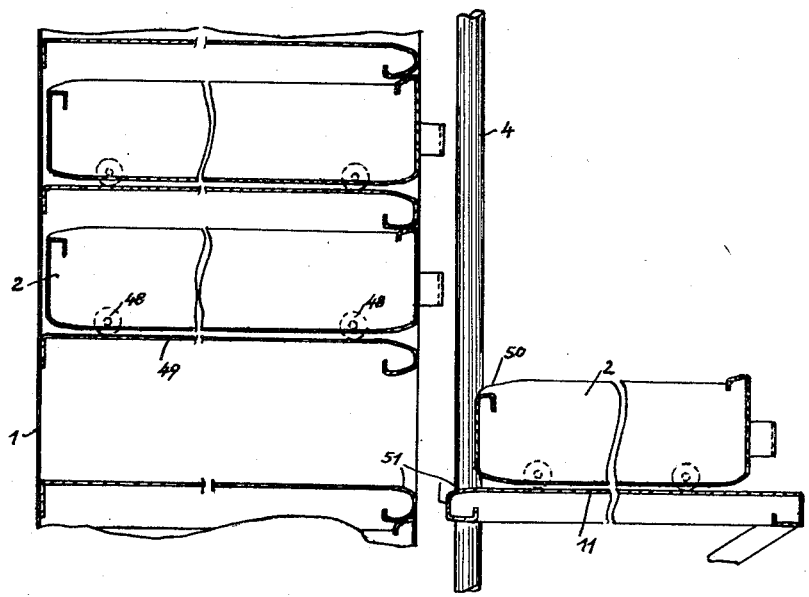
Fig. 5 is a partial, vertical section through a bank of cabinets in accordance with Fig. 1, showing a drawer or cabinet in the withdrawn position, and seating upon its corresponding lifting plate or carrier.

For easy mobility of the containers 2 when being withdrawn from the cabinet frame onto the carrier plate, the containers 2 may be provided on the bottom, in accordance with Fig. 5, with rollers 48 running on the horizontal partitions 49 of the frame 1. Alternatively, the container bottoms may be smooth, and the horizontal partitions 49 as well as the carrier plate 11, equipped with rollers on which the containers can run. Instead of full intermediate partitions, the containers may also run on rails or ledges, or in grooves in the cabinet frame. The ends of containers are suitably slightly tapered or rounded on their tops as shown at 50, and the facing edges of the carrier plate and container guides in the cabinet frame, sloped or rounded as at 51, to prevent skewing and jamming of the drawers if the carrier plate 11 should be somewhat inaccurately located.

Figure 6:
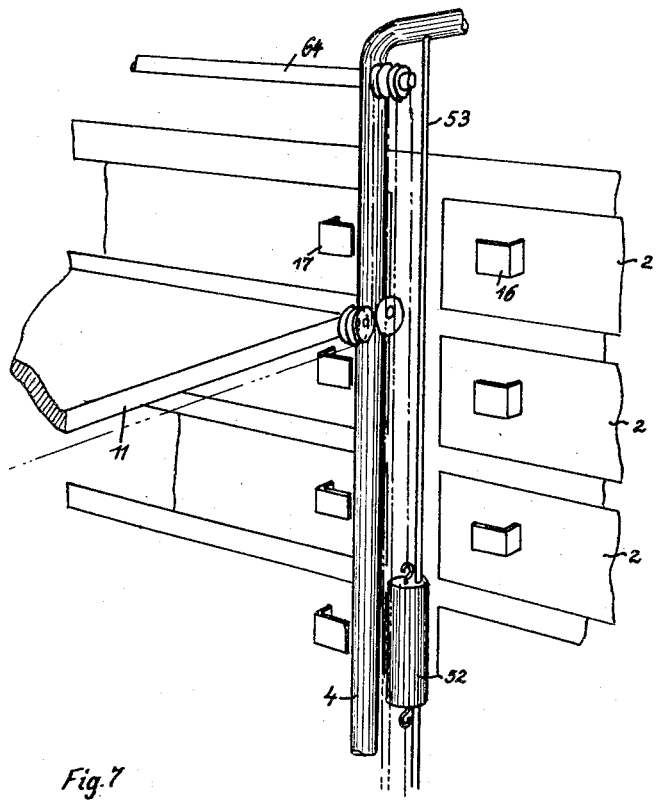
Figs. 6 and 7 are perspective partial views on a larger scale, of details of the conveying elements.

In order to reduce the required motive power for raising the lifting plate or carrier 11, in the case of vertical arrangements according to Figs. 1 and 2, counterweights 52 (Fig. 6) may be incorporated in the driving mechanism, which balance the weight of the carrier plate itself. These counterweights 52 run on corresponding lateral guides 53 associated with the carrier guides. If the vertical rails 4 of the lifting conveyor are tubular or of other hollow section, the counterweights 52 may be adapted to work inside these.

Figure 7:
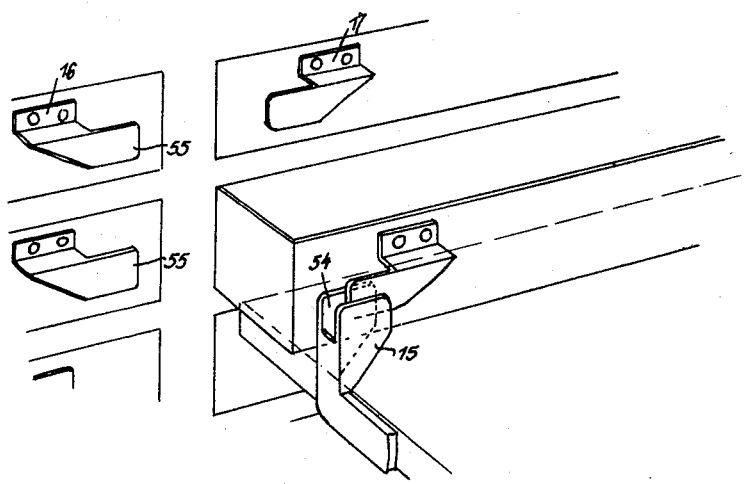

The followers 15 and 26 respectively on the lifting plate or guide and the corresponding stops 16, 17 on the containers are suitably formed as in Fig. 7. The followers 15 are in this case developed as forked lugs having a free passage 54 from the inner side facing the carrier plate, to the outside. The container stops 16, 17 are formed of cutout angle lugs with projections 55, downwardly and sideways. When the containers 2 or 24 are pushed home in their compartments, the followers 15 on the carrier plate project by the width of their forked ends over the rear edge of the carrier plate 11, towards the cabinet. The carrier plate is thus able to move in intersecting directions at will vertically or horizontally along the cabinet and its followers 15 will pass clear of the container lugs 16, 17, provided such motions are in the direction of the container rows and banks.

The container conveyor system can be differently operated and controlled depending on the type and design of the driving or actuating mechanism and the sequence of operations adopted. For instance, in the case of the arrangement according to Fig. 1, the driving mechanism may be so arranged that the carriage 3 with the lifting plate or carrier 11 must always return after use into a particular and invariable starting position, before it can be made to perform a new cycle of operations. This starting position may suitably be in front of the uppermost container of bank VI. The advantage of such an arrangement is that the carrier has always the same distance to travel from the starting position to the work table 19, whichever container is selected to be conveyed. If the uppermost container in bank VI is required, the distance travelled is fully utilized. If any other container in bank VI is demanded, below the former, the carrier must first be lowered to the corresponding level, after which it stops and withdraws the required container, and finally moves to the left with the carriage until it reaches the work-table. If container No. 18 is required, which in Fig. 1 has just been withdrawn, the carriage first travels from its starting position in front of container bank VI, to container bank III and there lowers the carrier plate from its uppermost end position to the level of container 18. This idle motion is followed by the actual operation of withdrawing the required container or unit from its place in the cabinet frame, lowering the carrier plate to the bottom position, and moving the carriage to the left. The return of the container to the storage point proceeds in the same manner, after which the carrier plate must perform an idle motion, after depositing the container 18 in its place, by rising upwardly and then moving with the carriage to the right, to reach the starting position. If now, the lowest container in bank I is required, the carrier plate must descend from its upper end position opposite bank VI and move to the left together with the carriage, all this distance being traversed idly. The actual working stage is then limited to withdrawing the container, i. e. to the motion of the followers on the carrier plate. In all these cases, the travel of the carrier plate from the upper end (or starting) position to the working or access position, is the same: the sequence of operations can, however, be varied. For instance, if the uppermost container of bank VI is required, either the carrier plate can be lowered immediately after withdrawing the container, and then moved to the left with the conveyor carriage; or, the conveyor carriage moves immediately from bank VI to bank I, after which, only, the carrier plate is lowered. If the already partially withdrawn container 18 is required, it can be conveyed in such manner that the carrier plate is lowered from its upper end position, in the first part of its idle motion, to the level of the container 18 in bank VI, and then conveyed together with the conveyor carriage to the bank III, where the required container 18 is extracted and returned on the carriage, firstly to position X and finally, by a downward motion, reaches the working point or table 19.

The possible control methods depend on the arrangement of the actuating gear; if this arrangement is different from the above, the drive may be so designed, that the carriage with carrier plate returns into a different end position after each operating cycle: for instance, to the position of the lowest container in bank I, in which case the starting position of the carrier plate is identical with the working position. In such cases, however, the carrier plate travels different distances at each operation, which involves certain difficulties in the design and layout of the operating gear.

Finally, the operating gear can be so arranged that after each operation the carrier plate remains in the position in which it has been left after returning a container to the cabinet frame. When another container is required, therefore, the carriage with the carrier plate has to travel from the position of the last-returned container to that of the container now required, which it then selects and delivers to the work-table. The operating mechanism then becomes somewhat more complicated but on the other hand, idle motion is reduced and the delivery of the containers is accelerated.

The above considerations in regard to the arrangement of the carrier 3 for the cases shown in Figs. 1 and 2, apply equally to the horizontally-movable rack 33 in the cabinet frame 31 according to Fig. 3.

The means of driving and transmission for the operation and control of the conveyor system described above may be of different nature and arrangement. For instance, three separate electric motors can be provided, of which one drives the movable carriage, one the lifting plate or carrier, and the third the follower elements on the carrier plate. The motors for the carriage and carrier plate can be controlled by drum contactors having a suitable setting in the manner of the number wheel of an adding machine or cash register, and operated by depressing a particular key, 20 or 21. According to the setting of the drum contactors, the motors are successively switched on for a sufficient time to enable the carrier plate to move exactly to the level of the selected container in the bank. The motor operating the follower elements 15 on the carrier plate can be fitted directly beneath this plate and be controlled by the drum contactor of the carrier plate driving motor, in such manner that when the latter motor is cut out, the operating circuit of the follower elements is simultaneously closed. Pole-change motors are suitably used, capable of reversing in either direction. Non-reversing motors can, however, also be used if suitable transmission gears and couplings are provided to enable the drive to be reversed when necessary.

The entire arrangement can, however, also be driven by a single motor if the transmission and control elements are suitably designed and constructed for the purpose. An example of such a driving mechanism for an arrangement as shown in Fig. 1, is illustrated in Figs. 8 to 18. The drive is in this case transmitted by ropes or cords, belts, chains or bands arranged in part in the base 10 of the cabinet frame 1, or in or at the rails 4 of the conveyor carriage 3, or partly on and below the carrier plate 11; while the driving motor and control elements are accommodated underneath the work-table 19.

The drive for the travelling carriage and elevator 3 is suitably taken from an endless cord or chain 55 (Fig. 8), running over pulleys 56, 57, one part of which is attached to the carriage underframe. The lifting plate or carrier 11 is actuated by a second endless band 58 running in the cabinet base 10 over pulleys 59, 60, and the upper part of which is led over a guide sheave 61 in the base of the carriage, thence in or along the carriage guide rail 4, upwardly to a further sheave 62, and downwardly over a second guide sheave 63. The sheave 62 is fixed on a spindle 64 the other end of which carries a similar fixed sheath 65. An auxiliary endless band 66 runs over this sheave 65 in the region of the other carriage guide rail, and returns upwardly round a second sheave 67 at the lower end of the said guide-rail. The driving band 66 is driven by the band 58 running around a sheave on spindle 64 and therefore follows all vertical movements of the latter band. The lifting plate or carrier 11 is attached to the corresponding parts of the driving bands 58 and 66, e. g. at the points 69 and is thus moved up and down by the reciprocating motions of the driving band 58.

The followers of the lifting plate or carrier are actuated by a third driving band 70 accommodated in the cabinet base and running over sheaves 71 and 72. The upper part of this driving band 70 runs upwards over a guide-pulley 73 on the conveyor carriage, passes over guide-pulleys 74, 75, 76, 77 and 78 on or below the lifting plate or carrier 11, then passes on the other side of this carrier plate 11 up the other guide-rail to a further guide pulley 79, running loosely on the spindle 64, and returns downwardly over an appropriate guide pulley 80 on the lower end of the conveyor carriage. The arrangement of the sheaves and pulleys on the lifting plate or carrier 11, is shown in Fig. 9. The followers 15 are attached to corresponding parts of the driving band 70 at the points 81.

The sheaves 57, 60, 72 fitted at the left-hand end of the cabinet base 10 (Fig. 1) are carried as shown in Fig. 10 on a common shaft or spindle 82 driven through gears 83, 84 by a reversing motor 85. The pulley 72 is keyed to the spindle 82 and thus rotates continuously with the latter. The pulleys 57 and 60, on the other hand, are carried on hollow sleeves 86, 87, rotating loosely on the spindle 82 and are provided with corresponding magnetic clutches 88, 89 and brake drums 90, 91, the latter being actuated by braking magnets 92, 93 through the intermediary of brake bands 94, 95. The clutch elements 88, 89 are locked on the spindle 82 and when the clutches are actuated establish connection by their follower plates 96, 97 between the spindle 82 and the corresponding pulleys 57 and 60 respectively.

The pulleys 57, 60, 72 are provided with additional grooves 98, 99, 100, for control cords 101, 102, 103. These cords run over sheaves 04, 05, 06 running loosely on a spindle 107 and their upper parts, as shown in Figs. 11, 12 and 13, are respectively connected to contactor slides 104, 105, 106, running to and fro in corresponding guides 107, 108, 109. These elements are housed in the base of the work table 19 (Fig. 1) and are so arranged that the contactor slides move within the range of the operating key banks 21 and 22.

In order to be able to use a least number of keys, the selector mechanism may be so arranged that each vertical container blank I–VI is assigned an appropriate key in key bank 21 and each horizontal container row is assigned an operating key in the key bank 22. In the case of 6 vertical banks and nine horizontal rows of container units there are consequently 54 available container positions, and the total number of keys required is thus no more than 15. Selection of a particular container consequently requires two keys to be depressed: for instance, if the sixth container from the top in container bank III is required, the third key in key bank 21 and the sixth key in key bank 22, must be depressed.

For this purpose, the keys of bank 21 are stationary, while the keys of bank 22 are carried in a movable slide on the work table 19. As shown in Fig. 17, the key bank 21 is fitted in a stationary carrier 110, while the keys 22 are held in a carrier 111, the upper edges of which slide longitudinally in guides 112. The carrier 111 is rigidly connected with the contactor slide housing 104 arranged below the key bank 21 and sliding in the guides 107. Similarly, the contactor slide 105 arranged below the movable key bank 22, slides in longitudinal guides 108 and is rigidly connected with the contactor slide housing 113 arranged underneath, running on the longitudinal guide 109. These contactor slide housings contain spring operated contacts 114, 115, 116, which in conjunction with the fixed contact 117 of the contactor slide 105 control the circuits of the magnetic clutches 88, 89 and magnetic brakes 92, 93. The contacts 114, 115 are operated by the keys 21, 22, while the contact 116 works in conjunction with the wiper arms 118, 119 of the contactor slide 106.

The keys 21, 22 are controlled by compression springs 120 and are provided with locking lugs 121, 122, engaging spring-controlled locking plates 123, 124 (Figs. 16, 17), movably carried on arms 125. When the keys are depressed, the locking plates engage the lugs 121, 122 and retain the keys in the depressed position until the locking plates are withdrawn by the action of the cords 126, and 127 respectively. The press-buttons 20 for starting the motor, either clockwise or anti-clockwise, are maintained by oppositely acting springs 128, 129 in a neutral mid-position and when depressed are engaged by pawls 130 (Figs. 17, 18) in slots 131 of the operating key spindles, retaining the keys in the depressed position until the pawls 130 are released by the cords 132, 133. These cords are controlled by levers 134, 135 located at the end positions of the conveyor arrangement. The movable keys 22 pass through longitudinal slots in the work table, the part of the top of which occupied by the key banks is covered with a movable shutter 136.

When a container is selected, e. g. No. 18 (Fig. 1) by depressing the third key in bank 21 and the sixth key in bank 22, the motor 85 is started by depressing the button 20 which simultaneously engages the clutches 88, 89. This, consequently, sets in motion the three cord pulleys 57, 60, 72 and therefore the three driving cords 55, 58, 70 as well as the three controlling cords 101, 102, 103. By their action, first the conveyor carriage 3 is moved to the left from its starting position, opposite the container bank VI (Fig. 1). The lifting plate or carrier 11, on the other hand, positioned at the upper end of the conveyor carriage, is still stationary, and its followers 15 are as yet inoperative, since the cords 58, 70, although already being driven, follow the motion of the conveyor carriage only in their lower parts, but have no relative displacement with reference to this carriage. Simultaneously, the control cord 101 moves the contactor slide 104 with the contact 114 along under the key bank 21 (Fig. 11) and as soon as this contact strikes the depressed third key of key bank 21, its pyramidal head is likewise depressed. Thereupon, the circuit of the magnetic clutch 88 is broken and the braking magnet 92 activated. The pulley 57 with the conveyor cord 55 and the control cord 101 are thus instantaneously stopped, while the other cords continue in motion. By the time that the conveyor cord 55 has stopped, the conveyor carriage 3 has reached its position shown in Fig. 1, opposite the container bank III. The control cord 101 now draws the contactor slide 104 as well as the holder 111 and key bank 22 along the guide slot in the work-table top. When the control cord 101 stops, with the key bank 22, the contactor slide 105 with the contact 115 now moves against the depressed sixth key of the key bank 22. Upon striking the contactor bar depressed by the locking plate 124, the contact 115 moves downwardly, thereby disconnecting the clutch 89 and connecting the brake magnet 93. The conveyor cord 55 has meanwhile stopped and the lifting plate or carrier 11, driven by the conveyor cord has moved from its upper end position, down to the level of the bottom of the container 18, which is still in place in the cabinet frame. No action of the followers 14, 15 has yet taken place, since the cord 70 follows the motion of the cord 58 and owing to the descent of the carrier plate, is lowered on the one side by the same amount as it is raised on the other side. Disconnection and braking of the cord pulley 60 now stops the conveyor cord 58 and with it the carrier plate 11, as well as the control cord 102. The conveyor cord 70 and the control cord 103 move on alone. The contact 116 situated above the control cord 102 (Figs. 13, 17) is moved by the control cord 102 together with the contactor slide 105 into a particular position, where it is stopped. At a constant distance in front of this contact 116, a contactor slide 106 is attached to the control cord 103, and is now brought forward with the trip lever 119 by the continuing motion of the cord 103, under the contact 116. During this motion of the control cord 103, the conveyor cord 70 draws the container 18 by means of the followers 14, 15 out of the cabinet frame 1 on to the carrier 11. As soon as the trip lever 119 strikes the contact 116 and displaces it, the clutch 89 is again engaged and the brake magnet disconnected. By this means, the conveyor cord 58 and carrier plate are again set in motion, while the followers 15 are stopped, since although their driving cord 70 continues in motion, it merely follows the travel of the carrier. The latter, consequently, continues to descend until it reaches its lowest end point, below the level of the lowest container in bank III. At this stage, the contact 117 (Figs. 12, 17) additionally provided on the contactor slide 105 is drawn by the control cord 102 under an actuating stop 137 at the end of the holder 111 of the movable but at the instant stationary, key bank 22. This causes the clutch 88 to engage, the brake magnet 92 to disconnect, and the conveyor cord 55 with the control cord 101 to resume their motion. Upon further motion of the conveyor carriage 3, the drive to the lifting plate or carrier 11 is disconnected since the still running conveyor cords 58 and 70 merely follow the motion of the conveyor carriage 3, which travels with the carrier, now in its lowest position, to the working point next to the work table 19. At this instant a stop 139 (Fig. 11) on the contactor slide 104 strikes against the trip lever 134 (Figs. 11, 18) and by means of the draw-cord 132, moves the engaged locking lever 130 into the release position in such manner that the depressed operating button 20 returns into its original position and cuts out the driving motor. The entire mechanism consequently stops.

When it is intended to return the selected container from the working point to its appointed place in the cabinet frame, and subsequently the conveyor carriage 3 with the lifting plate 11 into its starting position opposite the uppermost container in bank VI, it is first necessary to press the second operating button 20, by which the motor is started in the reverse direction. Simultaneously, the magnetic clutches 88, 89 are engaged and all three conveyor cords 55, 58, 70 with the corresponding control cords, set in motion. The originally-depressed keys 21, 22 remain depressed since their locking plates 123, 124 (Fig. 17) are inoperative. The contact 114 first again strikes the key 21 and stops the conveyor cord 55. This is the stage at which the carriage 3 has reached the container bank III. The conveyor cords 58, 70 continue moving and cord 58 draws the carrier 11 with the container 18 upwardly to the level of the bottom of the free or empty cabinet compartment. At this instant the contact 115 is under the key 22. The cord 58 now stops and the conveyor cord 70, remaining in motion, actuates the followers 15 which push the container back into the free compartment. As soon as this has been done, a trip lever 118 on the contactor slide 106, operates the contact 116 and thus restarts the cord 58. The carrier 11 moves upwardly into its uppermost position. At this instant the contact 117 of the contactor slide 105 moving together with the carrier (Fig. 12) strikes a stop 138 at the beginning of the movable but temporarily stopped holder 111 of the key bank 22. The operation of the contact 117 re-starts the conveyor cord 55 which moves the conveyor carriage 3 further, the carrier 11 being meanwhile stopped since the continuously-running cords 58, 70 merely follow the motion of the carriage. When the conveyor carriage 2 reaches its end position the stop 139 on the contactor slide 104 (Fig. 11) strikes a trip lever 135 which withdraws the corresponding pawl 130 by means of the draw-cord 133 and thus releases the depressed starting button 20 and stops the motor. Just previously, a second trip lever 140 actuated by the stop 139 (Fig. 11) applied tension to the cords 126, 127 (Figs. 11, 17) by which means the locking plates 123, 124 are withdrawn and the keys 21, 22 released. By this means, the entire arrangement is returned into the starting position and ready to repeat the selection of a further container.

Fig. 18 shows the circuit diagram for the reversing motor 85 with the two reversing relays 141 and 142. Upon depressing either of the two operating buttons 20, the motor is started in the corresponding direction, anti-clockwise or clockwise, while a contact arm 143 further closes a circuit with the conductors a—b leading to the magnetic clutches 88, 89. The circuit arrangements for these magnetic clutches are shown in Fig. 19 where the conductors a—b continue as the primary windings of a transformer 144. The secondary circuit of this transformer contains the windings of the magnetic clutches 88, 89, and the magnetic brakes 92, 93. These secondary circuits are controlled by the moving contacts 114, 115, 116, 117 (Fig. 17), the corresponding terminals of which are indicated in Figs. 17 and 19 by the letters c—c, d—d, e—e, f—f, g—g, h—h, i—i, k—k. Fig. 19 shows the position of the contacts before starting the motor. When the motor is started and the transformer 144 (Fig. 19) energized by depressing the contactor 143 (Fig. 18) then, in the position shown, the clutch magnets 88, 89 are energized, i. e. the clutches are engaged, but the brake magnets 92, 93 are still disconnected owing to interruption of their circuits at d—d and f—f. When the contact 114 strikes the depressed key 21, the secondary circuits are broken at c—c and closed at d—d, i. e. the magnetic clutch 88 is released and the corresponding brake magnet 92 energized. This causes, as described earlier, stopping of the conveyor cord 55 and control cord 101. When, next, contact 115 (Fig. 17) strikes the depressed key 22, the circuit is broken at e—e and closed at f—f. This breaks the circuit of the magnetic clutch 89, i. e. the clutch is disengaged and the brake magnet 93 energized. This, as described earlier, stops the conveyor cord 58 and control cord 102. When further, as already described, the contact 116 (Figs. 17, 13) is operated by the trip lever 119, g—g is closed and h—h opened, again engaging the clutch 89 and disconnecting the brake 93, re-starting the control cord 102 (Fig. 12), which draws the contact 117 against the stop 137 and reverses this contact 117 in such manner that in Fig. 19, k—k is opened and i—i closed. This releases the brake 92 and engages the clutch 88 in such manner that the conveyor cord 55 and control cord 101 (Fig. 10) are re-started. These continue running until the carrier reaches its end position when withdrawal of the engaged locking pawl 130 (Fig. 18) releases the previously depressed starting button 20, stopping the motor 85 and de-energizing the transformer 144 with its primary conductors a—b.

Since the carrier upon attaining the end position holds the withdrawn pawl 130 in the release position, the motor can only be re-started by depressing the other starting button 20 by which also the transformer is energized, the motor then running in the reverse direction in such manner that the conveyor and control cords repeat the same operations in the reverse order.

The contact 116, depressed by a compression spring 145 must be reversed for disengaging the clutch 89 every time when the selected container reaches an end position. This reversal is effected by the trip levers 118, 119 which as shown in Figs. 14 and 15, have the form of rocker arms turning on pivots 146. These levers are held by tension springs 147 in a vertical position in which they are supported by stops 148. Both ends of the slide 109 are provided with lateral stops 149, 150 and 151, 152 respectively arranged in pairs on each side of the slide 109. The stops 150, 151 are in staggered arrangement and engage with lateral stops 153 on the trip levers 118, 119 in such manner that the trip levers upon striking the corresponding stop 150 or 151 respectively are swung against the action of a spring 147 into an oblique position, as shown in Figs. 13 and 15 for the trip lever 118. The reversed lever is held in this oblique position by a corresponding pawl 155 or 156 respectively, which when the trip lever is tilted automatically engage notches in this lever under the action of a spring 157. The two other stops 149 and 152 are likewise staggered at the opposite end of the slide 109 and act in conjunction with pawls 155, 156 which are bent in opposite directions, in such manner that the stop 149 controls only the pawl 156, and the stop 152 only the pawl 155. Upon striking the corresponding stop the engaged pawl is withdrawn into the release position in such manner that the tilted contactor lever is enabled to return to the vertical. This arrangement of trip levers, pawls and stops assures suitable control of the contact 116.

In the arrangement described above, the conveyor carriage and lifting plate or carrier, after returning the selected container to the filing position, return to a predetermined and invariable starting position, from which the next cycle of operations is initiated. As already mentioned, however, it is possible to arrange the mechanism in such manner that the carriage and carrier plate remain stationary at the point of return of the last selected container, and start the next operating cycle from that point. It is in such case necessary that the carriage should, after selection of a further container in some other row or bank, be capable of travelling automatically from its last position of rest either to the left or to the right, to the particular bank in which the next required container is situated; while the carrier plate must be able to move from the resting position either upwardly or downwardly, depending on the higher or lower position of the new with reference to the preceding, required container. If the mechanism is to be controlled in the same manner by means of a rope or cord drive driven by a single motor, certain modifications will require to be introduced in various parts of the mechanism, which will now be described.

In accordance with Fig. 20, which is essentially similar with Fig. 10, the reversing motor 85 is replaced by a non-reversing, electric motor 158, driving through gears 159, 160 a belt pulley 161. From this pulley, a crossed belt 162 running additionally over a jockey pulley 163, drives two loose sheaves 164, 165 on the shaft 82, in opposite directions. The sheaves 164, 165 are associated with clutches 166, 167 keyed on the shaft 82. A fork 168 operated by magnets 169, 170 shifts the clutch sheaves 164, 165 along the spindle, and thus enables either clutch to be engaged at will, in such manner that the shaft or spindle 82 can be driven in either direction independently of the sense of rotation of the driving motor. Springs 171 and 172 return the fork 168, after disconnecting the magnets 169, 170, into a neutral position in which the clutch discs 164, 165 run loosely on the shaft 82, which consequently remains at rest. The jockey pulley 163 is supported in a second fork 173 and is controlled by a draw-cord 174 running over a sheave 175 and loaded with a weight 176.

The required modifications in the control elements are shown in Figs. 21–23. The solution contemplated by the invention, of the problem of automatically obtaining the left-hand or right-hand motion of the conveyor carriage and lifting plate or carrier by simply depressing a selector key, is provided by the use of movable contact rails working in conjunction with the selector keys 20, 21, for the containers.

In accordance with Figs. 21 and 22 which is essentially similar to Figs. 16 and 17 of the mechanism heretofore described, the contactor slides 104, 105 and the connected holders 111, 113, are each provided with a channelled bar 177 and 178 respectively. Each channel contains two consecutive contact rails, insulated from each other. In particular, channel bar 177 according to Fig. 23 contains the two contact rails 179, 180, and the channel bar 178, the contact rails 181, 182. Each of these contact rails consist of two opposed, metal conductor rods. The contact rails 179 and 181 are connected by conductors 183 and 184 respectively, to the circuit of the clutch magnet 169 (Fig. 20) for left-hand running; while the contact rails 180 and 182 are connected by conductors 185 and 186 respectively to the circuit of the clutch magnet 170 for right-hand running, of the driving spindle 82. Each of the selector keys for selecting the containers is provided with a wiper; in particular all wipers of the selector keys 21 are denoted by 187, and the wipers of the selector keys 22, by 188. These wipers are provided on their lower, hooked ends with insulated wiping contacts, and constitute conducting links in the circuits of the corresponding clutch magnets, when they are made by depressing the keys 21 or 22 respectively, to bridge the two metal rods of a contact rail. Between the two contact rails 179 and 180, and the two contact rails 181, 182 respectively, circuit breaks 189 and 190 (Fig. 23) are provided. These circuit breaks are placed laterally exactly opposite to the contacts 114 and 115 on the contactor slides 104 and 105 respectively. The length of each of the contact rails 179, 180, corresponds to the length of the key bank 21, while the length of the contact rails 181, 182 is identical with the length of the key bank 22; and the length of travel of the contact rails moving together with the control cords 101 or 102 respectively is similarly equivalent to the length of the appropriate key banks. When, therefore, any key in banks 21 or 22 is depressed, the corresponding contact rails are bridged at some corresponding point by the wiper of the appropriately depressed key and consequently the driving shaft 82 is started for rotation either left-handed or right-handed: provided the wiper of the depressed key does not happen to coincide with either of the circuit gaps 189, 190.

The contact rails 179 and 180 control the drive for the conveyor carriage while the contact rails 181 and 182 control the operation of the lifting plate or carrier. After the required container has been selected by depressing the corresponding key in bank 21 for the vertical row, and the corresponding key in bank 22 for the horizontal row, in which the said container is located, and this container has meanwhile been returned to its permanent position, the drives for the carrier plate and the carriage are successively cleared in the manner that with reversed motion of the control cords 101 and 102, the contacts 114, 115 (Fig. 22) are made to abut against the depressed selector keys 21 or 22. It is assumed that Fig. 25 represents the final position of the contact rails after return of a container to the rack or cabinet. When the selector keys are counted from the right-hand side, the selected container will be found represented by the third key in bank 21, showing its vertical position, and by the fifth key in bank 22, showing its horizontal position. The contact wipers 187 and 188, respectively of the third key in bank 21 and the fifth key in bank 22 are in this position opposite the circuit gaps 189, 190, which are situated exactly at the contacts 114, 115 (Fig. 22), which consequently strike against the depressed keys and cause the machinery to stop.

If some other container is selected, not being in the same vertical and horizontal banks and rows, two further keys in banks 21 and 22 respectively, are depressed. The formerly depressed keys are released after the container has been returned to its place in the cabinet, and have assumed their initial positions. Depending on whether the next depressed key of the bank 21 is situated to the left or the right of the circuit gap 189, either the conductor 185 or the conductor 183 are energized, driving the shaft 82 (Fig. 20) either clockwise or anticlockwise, by which means the conveyor carriage is made to travel from the position of the last-returned container either to the left or to the right until it is opposite the newly-selected vertical bank of the cabinet, corresponding to the last-operated key of bank 21. The stopping of the conveyor carriage at this selected container bank is initiated in the manner that the element carrying the contact 114 strikes the last-depressed key 21 (Fig. 22) and causes the contact 114 to reverse. At this instant the contact wiper 187 of the last-depressed key 21 is opposite the circuit gap 189 in such manner that the circuit incorporating the conductors 183 or 185 is interrupted. The contact 114 is in this case, contrary to the arrangement shown in Fig. 17 provided with additional counter contacts m—m and n—n, forming part of the circuits of the conductors 184, 186 (Fig. 23) for the contact rails 181, 182, in such manner that the latter are energized and start the carrier drive, only when the conveyor carriage drive is stopped. Depression of the selector key 22 cannot yet, therefore, be effective on the driving shaft, and the key bank in its movable holder 111 (Fig. 22) with the control cords 102, 103, which follow the motion of the control cord 101, is merely moved forward through a distance equivalent to the travel of the contactor slide 104 with the contact 114, and the contact rails 179, 180. As soon as the contact 114 reverses upon stopping of the conveyor carriage, it acts through the counter contacts m—m and n—n, energizing the conductors 184, 186, and with them the contact rails 181 and 182. Depending on which of these contact rails is struck by the wiper 188 of the last-depressed key, the right-hand or the left-hand drive of the spindle 82 is energized. Simultaneously, the control cord 101 remains idle, by the operation of the coupling and braking means described in Figs. 10–17 so that according to the sense of rotation of the driving shaft, only further motion of the lifting plate or carrier upwards or downwards, takes place. This vertical motion of the carrier ceases as soon as the contact 115 moving on with the control cord 102, strikes the depressed and stationary selector key 22, and is reversed. Simultaneously, the circuit gap 190 between the contact rails 182, comes within the range of the depressed contact wiper 188 in such manner that the circuit to the conductors 184, 186 is interrupted and the driving shaft stops. At this instant the carrier plate has reached the position of the newly-selected container in the cabinet frame. This is followed by the further operations of the conveyor viz. withdrawal of the selected container from the frame on to the carrier plate and its conveyance to the working point by suitable displacement of the carrier plate and the conveyor carriage, the return from the working point to the storage or filing point in the cabinet frame, and the return of the container into the appropriate frame compartment, in the same manner as with the arrangement shown by Figs. 10–19.

If, after one container has been returned to the frame it is desired to select a further container situated in the same vertical bank of the cabinet frame, with reference to the end position shown in Fig. 23, i. e. again a container in the third vertical bank of the cabinet frame, but situated higher or lower than the last-selected container, then, upon depressing the appropriate selector key in bank 21 the corresponding contact wiper 177 will strike the circuit gap 189 between the contact rails 179, 180. No circuit is therefore established through these contact rails and the cords operating the conveyor carriage remain inoperative. Depression of the selector key 21 therefore merely displaces the contact 114 downwards (Fig. 22). This contact is laterally abreast of the circuit gap 189 and is, therefore, similarly, still under the third selector key in the bank 21, after the return of the preceding container. The depression of the contact 114 energizes the contact rails 181, 182, through the counter contacts m—m and n—n. Consequently, depression of the next selector key 22 for the required container, starts the driving shaft 82 clockwise or anticlockwise, through the intermediary of the wiper 188 and one of the above-mentioned contact rails. This starts the driving cords for the carrier, which is raised or lowered until it comes opposite the position of the required container.

If after a container has been returned to its place in the cabinet frame the same container is again required, the same selector keys are again depressed, under which the switching contacts still remain after completion of the preceding return of the container to the frame. The wipers 187 and 188 of both selector keys engage in the circuit gaps 189, 190 of the contact rails. The contact 114 is of course reversed by the depression of the key 21, and through the counter contacts m—m and n—n energizes the contact rails 181, 182, but the circuit through these two contact rails is not yet completed by the wiper 188. Neither the conveyor carriage nor the carrier plate are set in motion. Depression of the key 22 moves the contact 114 downwards, and through the corresponding counter contacts energizes only the cord drive actuating the followers on the carrier plate, by which the just previously returned container is again withdrawn from the frame.

The location of the lateral stops 149, 151 (Fig. 13) incorporated in the control gear of the arrangement according to Figs. 10–19, for the control cord 103 and associated contactor slide 106, operating trip levers 118, 119 on this contactor slide in the fixed end positions of the conveyor carriage and lifting plate or carrier, is modified in the arrangement now described, since in this modification the end positions are no longer fixed and invariable. In accordance with Fig. 24, essentially corresponding to the preceding Fig. 15 they are now to be found on the movable housing 113 of the contactor slide 105. The stops 150, 152, on the other hand, are retained in the original positions, corresponding to the end point of the travel of the container at the work table 19 (Fig. 1).

The invention is not restricted to details of the design of the mechanism. The contact rails 179, 180 and 181, 182 respectively, may consist of conducting chain links in order to save space in the control gear by causing them to lead downwards, or may consist of endless chains running over guide pulleys. Instead of cords, and for better security against displacement of the moving parts, belts, or chains may be used in the conveyor and control lines, and cord pulleys or corresponding sheaves may be replaced by belt pulleys or chain sprockets. The horizontal displacement of the carrier plate or tray by the conveyor carriage for conveyance of the containers to the working point and their return to the cabinet frame, may be effected in any position of the carrier or tray other than the lowest. The containers may differ in width, length and height, when the dimensions of the carrier tray should be adapted to those of the largest container to be handled. The work table carrying the selector key banks may be arranged at a distance from the container frame or rack. More than one working point or work table may be provided, to which the conveyor carriage and tray deliver containers in any desired sequence, e. g. a working point at each end of a frame or rack. The conveyor carriage may be equipped with a number of different carriers or trays, operated separately and consecutively to enable a number of containers to be delivered simultaneously to a working point. The conveyor carriage may be associated with identical or similar means of conveyance, receiving containers at the working points or other suitable points in the system and conveying them further in other conveyor systems. The followers as described may be replaced by claw grips or toggle claws, for gripping the containers in the rack or cabinet and transferring them to the carrier or tray, or for returning the containers to the rack or cabinet.

I do not limit my invention to the exact forms shown in the drawings, for obviously changes may be made therein within the scope of the claims.

I claim:

1. A conveyor for structures of the type described, including a cabinet-like frame having drawers or the like arranged in tiers in adjacent banks; comprising at least one conveyor plate adapted to be brought to each drawer of all banks; a displaceable frame carriage formed by parallel rods serving as guides for said conveyor plate and extending across the main surface of the drawer frame; means on the conveyor plate for withdrawing a selected drawer from the frame onto the conveyor plate and back again into the frame; said withdrawing means comprising cooperating elements on the drawer and conveyor plate; said carriage transferring the conveyor plate with the withdrawn drawer to a working point and the drawer back again to its storing place in the frame; a hollow base projecting from the frame and extending over the entire length thereof; a steering table arranged at one end of the frame and being in open connection with the respective end of said hollow base; means for driving the conveyor plate and its guiding carriage, said driving means extending lengthwise of said carriage and lengthwise of said hollow base into the steering table; operating means disposed within said steering table adapted to move said driving means for the conveyor plate and for its carriage; and selecting means arranged on said steering table and coacting with said operation means for the control of their operation time and consequent control of the displacements of said conveyor plate and carriage, said cooperating elements being so arranged that when the conveyor carriage is moved in vertical and horizontal directions respectively, said elements are able to engage or pass each other as required.

2. A conveyor for structures of the type described, including a cabinet-like frame having drawers or the like arranged in tiers in adjacent banks; comprising at least one conveyor plate adapted to be brought to each drawer of all banks; a displaceable frame carriage formed by parallel rods serving as guides for said conveyor plate and extending across the main surface of the drawer frame; means on the conveyor plate for withdrawing a selected drawer from the frame onto the conveyor plate and back again into the frame; said carriage transferring the conveyor plate with the withdrawn drawer to a working point and the drawer back again to its storing place in the frame; a hollow base projecting from the frame and extending over the entire length thereof; a steering table arranged at one end of the frame and being in open connection with the respective end of said hollow base; means including flexible cords for driving the conveyor plate and its guiding carriage, said driving means extending lengthwise of said carriage and lengthwise of said hollow base into the steering table; operating means including other operating cords disposed within said steering table adapted to move said driving means for the conveyor plate and for its carriage; and selecting means arranged on said steering table and coacting with said operating means for the control of their operation time and consequent control of the displacements of said conveyor plate and carriage, the conveyor plate, the means on said plate for withdrawing the drawers and the displaceable carriage guiding the conveyor plate all being actuated by other flexible cords, said flexible cords and said other flexible cords being driven from a common driving spindle, and being controlled by said other cords driven by the spindle and moving at lower speeds and operating movable control elements governing the motions of the first mentioned cords, these cords extending lengthwise the hollow base of the frame into the steering table and said other cords and movable control elements moving within the steering table and cooperating with stopping keys disposed thereon.

3. A conveyor for structures of the type described, including a cabinet-like frame having drawers or the like arranged in tiers in adjacent banks; comprising at least one conveyor plate adapted to be brought to each drawer of at least one tier; means on the conveyor plate for withdrawing a selected drawer from the frame onto the conveyor plate and back again into the frame; said conveyor plate transferring the drawer to a working point and back again to its storing place in the frame; a hollow base projecting from the drawers receiving part of the frame and extending over the entire length thereof; a steering table arranged at one end beside the drawer frame and being in open connection with the respective end of said hollow base; driving means for the conveyor plate extending lengthwise within said hollow base and into said steering table; operating means disposed within said steering table adapted to move said driving means for the conveyor plate; and selecting means arranged on said steering table and coacting with said operating means for the control of their operation time and consequent control of the displacement of said conveyor plate, said steering table having a plurality of keys controlling the motion of the conveyor, and the motion of the means on the conveyor plate, said keys for actuating the means on the conveyor plate being arranged on a guide element actuated by a control cord.

4. A conveyor for structures of the type described, including a cabinet-like frame having drawers or the like arranged in tiers in adjacent banks; comprising at least one conveyor plate adapted to be brought to each drawer of all banks; a displaceable frame carriage formed by parallel rods serving as guide for said conveyor plate and extending across the main surface of the drawer frame; means on the conveyor plate for withdrawing a selected drawer from the frame onto the conveyor plate and back again into the frame; said carriage transferring the conveyor plate with the withdrawn drawer to a working point and the drawer back again to its storing place in the frame; a hollow base projecting from the frame and extending over the entire length thereof; a steering table arranged at one end of the frame and being in open connection with the respective end of said hollow base; means for driving the conveyor plate and its guiding carriage, said driving means extending lengthwise of said carriage and lengthwise of said hollow base into the steering table; operating means disposed within said steering table adapted to move said driving means for the conveyor plate and for its carriage; and selecting means arranged on said steering table and coacting with said operating means for the control of their operation time and consequent control of the displacements of said conveyor plate and carriage, said steering table having a plurality of keys controlling the motion of the conveyor plate, the motion of the means on the conveyor plate and the motion of the displaceable carriage guiding the conveyor plate; said keys for actuating the means on the conveyor plate being arranged on a guide element actuated by a control cord; said control cord actuating a contact interacting with a release element actuated by the control cord of the conveyor plate.

5. A conveyor for structures of the type described including a cabinet-like frame having drawers or the like arranged in tiers in adjacent banks; comprising in combination a conveyor plate for the transportation of the drawers, a belt for driving the conveyor plate along the drawer tiers, movable followers displaceably attached to guides on opposite sides of the conveyor plate for withdrawing a selected drawer from the frame onto the conveyor plate and back again into the frame; an additional belt for propelling said movable followers and being guided on the underside of said conveyor plate; both belts running parallel with their ropes and being driven by rope wheels mounted on a common driving shaft, one of said wheels running free on the driving shaft and being provided with coupling means for connecting this wheel with the common driving shaft; each of said belts being coordinated to an additional steering belt driven by the said driving shaft at lower speed; and each additional belt driving a control slide, one of said control slides cooperating with a system of keys provided for the selection of the drawers to be transported by the conveyor plate, the other side cooperating with contacts for operating the clutch coupling said free running wheel of the one belt with the common driving shaft, a displaceable frame carriage formed by parallel rods serving as guides for said conveyor plate and extending across the main surface of the drawer frame; a third main belt for driving said frame carriage on rails along the cabinet frame, said third belt running essentially parallel to the said belts for driving the conveyor plate and for driving the followers positioned on the plate for operating the drawers; all three main belts being driven by wheels mounted on a common driving shaft, coupling means for connecting the wheels with the common driving shaft; each of said three main belts being coordinated to additional steering belts driven by the same driving shaft at lower speed than the main belts; said steering belts driving control slides one of which cooperates with a system of keys provided for the selection of the drawers to be transported by the conveyor plate, and the other slides cooperating with contacts for operating the coupling means for coupling the wheels of the main belts with the common driving shaft.

References Cited in the file of this patent

UNITED STATES PATENTS

| | | |
|---|---|---|
| 940,878 | Jones | Nov. 23, 1909 |
| 1,786,112 | Hart | Dec. 23, 1930 |
| 2,270,896 | Rippon | Jan. 27, 1942 |
| 2,386,520 | Watson et al. | Oct. 9, 1945 |
| 2,526,823 | Mansfield | Oct. 24, 1950 |
| 2,553,003 | Popoff | May 15, 1951 |

FOREIGN PATENTS

| | | |
|---|---|---|
| 503,320 | Great Britain | Mar. 30, 1939 |
| 559,255 | Great Britain | Feb. 10, 1944 |